(12) United States Patent
Wang et al.

(10) Patent No.: US 12,200,146 B2
(45) Date of Patent: Jan. 14, 2025

(54) BLOCKCHAIN-BASED DATA PROCESSING METHOD AND APPARATUS, COMPUTER DEVICE, COMPUTER-READABLE STORAGE MEDIUM, AND COMPUTER PROGRAM PRODUCT

(71) Applicant: TENCENT TECHNOLOGY (SHENZHEN) COMPANY LIMITED, Guangdong (CN)

(72) Inventors: Zhang Wang, Guangdong (CN); Yixin Guo, Guangdong (CN); Dezhi Wei, Guangdong (CN); Zhaochuang Wang, Guangdong (CN); Xiaoqiang Qiao, Guangdong (CN); Youwei Liu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 326 days.

(21) Appl. No.: 17/941,508

(22) Filed: Sep. 9, 2022

(65) Prior Publication Data

US 2023/0006842 A1  Jan. 5, 2023

Related U.S. Application Data

(63) Continuation of application No. PCT/CN2021/119928, filed on Sep. 23, 2021.

(30) Foreign Application Priority Data

Oct. 21, 2020  (CN) .......................... 202011131362.6

(51) Int. Cl.
*H04L 29/06* (2006.01)
*H04L 9/00* (2022.01)
*H04L 9/32* (2006.01)

(52) U.S. Cl.
CPC .......... *H04L 9/3268* (2013.01); *H04L 9/3265* (2013.01); *H04L 9/3297* (2013.01); *H04L 9/50* (2022.05)

(58) Field of Classification Search
CPC ... H04L 9/3265; H04L 9/3268; H04L 9/3297; H04L 9/50
See application file for complete search history.

(56) References Cited

U.S. PATENT DOCUMENTS

| 10,637,665 B1 | 4/2020 | Sundaresan |
| 2020/0004846 A1 | 1/2020 | Camenisch et al. |
| 2020/0193425 A1* | 6/2020 | Ferenczi ............ G06Q 20/3829 |

FOREIGN PATENT DOCUMENTS

| CN | 110070443 A | 7/2019 |
| CN | 111431903 A | 7/2020 |

(Continued)

OTHER PUBLICATIONS

Chinese Office Action for 2020111313626 dated Dec. 1, 2020.
(Continued)

*Primary Examiner* — Jeffrey C Pwu
*Assistant Examiner* — Thong P Truong
(74) *Attorney, Agent, or Firm* — Sughrue Mion, PLLC

(57) ABSTRACT

A blockchain-based data processing method and apparatus, a computer device, and a computer-readable storage medium. The method includes: obtaining a data authorization request transmitted by an authorization terminal, the data authorization request including a data authorization certificate associated with an authorizer; performing authorization verification on the authorizer according to the data authorization request to obtain a first verification result; signing the data authorization certificate according to a private key of a first blockchain in a case that the first verification result is a valid result to obtain a first certificate signature, determining the first certificate signature as a (Continued)

to-be-uploaded signature, and performing uploading on the data authorization certificate carrying the to-be-uploaded signature; and transmitting the data authorization certificate to a second blockchain, and providing a query permission to a query terminal in a case that signature verification on the to-be-uploaded signature by the second blockchain succeeds.

20 Claims, 12 Drawing Sheets

(56) References Cited

FOREIGN PATENT DOCUMENTS

| CN | 111539718 A | 8/2020 |
|---|---|---|
| CN | 111600908 A | 8/2020 |
| CN | 111666323 A | 9/2020 |
| CN | 111970129 A | 11/2020 |

OTHER PUBLICATIONS

International Search Report for PCT/CN2021/119928 dated, Dec. 28, 2021 (PCT/ISA/210).
Written Opinion of the International Searching Authority for PCT/CN2021/119928 dated, Dec. 28, 2021 (PCT/ISA/237).

* cited by examiner

BLOCKCHAIN-BASED DATA PROCESSING METHOD AND APPARATUS, COMPUTER DEVICE, COMPUTER-READABLE STORAGE MEDIUM, AND COMPUTER PROGRAM PRODUCT

CROSS-REFERENCE TO RELATED APPLICATION(S)

This application is a continuation application of International Application No. PCT/CN2021/119928, filed on Sep. 23, 2021, which claims priority to Chinese Patent Application No. 202011131362.6, filed with the China National Intellectual Property Administration on Oct. 21, 2020, the disclosures of which are incorporated herein in their entireties.

FIELD

The present disclosure relates to the field of Internet technologies, and in particular, to a blockchain-based data processing method and apparatus, a computer device, a computer-readable storage medium, and a computer program product.

BACKGROUND

With the rapid development of network technologies and enterprises' attention to data security, blockchains have been greatly developed and applied. When service data of enterprises is stored in the blockchains, and data users query or obtain the data through the blockchains. To ensure the security of the service data, the enterprises need to authorize the service data to the blockchains, so that the blockchains provide a query permission to the data users according to the authorized content.

Enterprises or users may include data of a plurality of types such as enterprise tax data, social insurance data, and business data. The data of different types is stored in different blockchains. In the related art, when a data user obtains service data from a blockchain A, a data authorizer (that is, the enterprise or the user) needs to perform authentication on the blockchain A. When the data user obtains service data from a blockchain B, the data authorizer needs to perform authentication on the blockchain B. The same is true for obtaining service data on remaining blockchains. When the data user needs to obtain service data from a plurality of blockchains, the data authorizer needs to perform a plurality of times of authorization. However, the data authorizer needs to perform verification for each authorization, and the repeated verification process reduces data authorization efficiency of the data authorizer.

SUMMARY

An embodiment of the disclosure may provide a blockchain-based data processing method, performed by a verification node, the verification node corresponding to a first blockchain in a consortium blockchain, the consortium blockchain further including a second blockchain, and the method including: obtaining a data authorization request transmitted by an authorization terminal, the data authorization request including a data authorization certificate associated with an authorizer; performing authorization verification on the authorizer according to the data authorization request, to obtain a first verification result; signing the data authorization certificate according to a private key of the first blockchain in a case that the first verification result is a valid result, to obtain a first certificate signature, determining the first certificate signature as a to-be-uploaded signature, and performing uploading on the data authorization certificate carrying the to-be-uploaded signature; and transmitting, in a case that a certificate cross-chain query request transmitted by the second blockchain is received by using a cross-chain gateway, the data authorization certificate carrying the to-be-uploaded signature to the second blockchain by using the cross-chain gateway; and providing a query permission to a query terminal according to the data authorization certificate in a case that signature verification on the to-be-uploaded signature by the second blockchain succeeds, the query permission being used for the query terminal to obtain data provided by the authorizer in the second blockchain.

An embodiment of the disclosure may provide a blockchain-based data processing method, performed by a query node, the query node corresponding to a second blockchain in a consortium blockchain, the consortium blockchain further including a verification blockchain, and the method including: obtaining a data query request associated with an authorizer and transmitted by a query terminal; transmitting a certificate cross-chain query request for the authorizer to the verification blockchain by using a cross-chain gateway, the certificate cross-chain query request being used for the verification blockchain to determine a data authorization certificate carrying a to-be-uploaded signature, the to-be-uploaded signature being obtained by signing the data authorization certificate by the verification blockchain according to a private key of the verification blockchain after the authorizer is determined as a valid authorizer; obtaining, by using the cross-chain gateway, the data authorization certificate carrying the to-be-uploaded signature transmitted by the verification blockchain; and performing signature verification on the to-be-uploaded signature according to a public key of the verification blockchain, and providing a query permission to the query terminal according to the data authorization certificate in a case that the signature verification succeeds, the query permission being used for the query terminal to obtain data provided by the authorizer in the second blockchain.

An embodiment of the disclosure may provide a blockchain-based data processing apparatus, running in a verification node, the verification node corresponding to a first blockchain in a consortium blockchain, the consortium blockchain further including a second blockchain, and the apparatus including: a request obtaining module, configured to obtain a data authorization request transmitted by an authorization terminal, the data authorization request including a data authorization certificate associated with an authorizer; a verification authorization module, configured to perform authorization verification on the authorizer according to the data authorization request, to obtain a first verification result; a first processing module, configured to sign the data authorization certificate according to a private key of the first blockchain in a case that the first verification result is a valid result, to obtain a first certificate signature, determine the first certificate signature as a to-be-uploaded signature, and perform uploading on the data authorization certificate carrying the to-be-uploaded signature; and a certificate transmitting module, configured to transmit, in a case that a certificate cross-chain query request transmitted by the second blockchain is received by using a cross-chain gateway, the data authorization certificate carrying the to-be-uploaded signature to the second blockchain by using the cross-chain gateway; and provide a query permission to a query terminal according to the data authorization certificate in a case that signature verification on the to-be-uploaded signature by the second blockchain succeeds, the query permission being used for the query terminal to obtain data provided by the authorizer in the second blockchain.

An embodiment of the disclosure may provide a blockchain-based data processing apparatus, running in a query node, the query node corresponding to a second blockchain in a consortium blockchain, the consortium blockchain further including a verification blockchain, and the apparatus including: a first obtaining module, configured to obtain a data query request associated with an authorizer and transmitted by a query terminal; a first transmitting module, configured to transmit a certificate cross-chain query request for the authorizer to the verification blockchain by using a cross-chain gateway, the certificate cross-chain query request being used for the verification blockchain to determine a data authorization certificate carrying a to-be-uploaded signature, the to-be-uploaded signature being obtained by signing the data authorization certificate by the verification blockchain according to a private key of the verification blockchain after the authorizer is determined as a valid authorizer; a second obtaining module, configured to obtain, by using the cross-chain gateway, the data authorization certificate carrying the to-be-uploaded signature transmitted by the verification blockchain; and a permission providing module, configured to perform signature verification on the to-be-uploaded signature according to a public key of the verification blockchain, and provide a query permission to the query terminal according to the data authorization certificate in a case that the signature verification succeeds, the query permission being used for the query terminal to obtain data provided by the authorizer in the second blockchain.

An embodiment of the disclosure may provide a computer device, including: a processor, a memory, and a network interface, the processor being connected to the memory and the network interface, the network interface being configured to provide a data communication function, the memory being configured to store a computer program, the processor being configured to invoke the computer program to perform the method according to the foregoing embodiments.

An embodiment of the disclosure may provide a non-transitory computer-readable storage medium, storing a computer program, the computer program including program instructions, the program instructions, when executed by a processor, performing the method according to some embodiments.

An embodiment of the disclosure may provide a computer program product or a computer program, including computer instructions stored in a computer-readable storage medium. A processor of a computer device reads the computer instructions from the computer-readable storage medium. The processor executes the computer instructions, to cause the computer device to perform the method according to the foregoing embodiments.

DESCRIPTION OF EMBODIMENTS

Figure 1A:
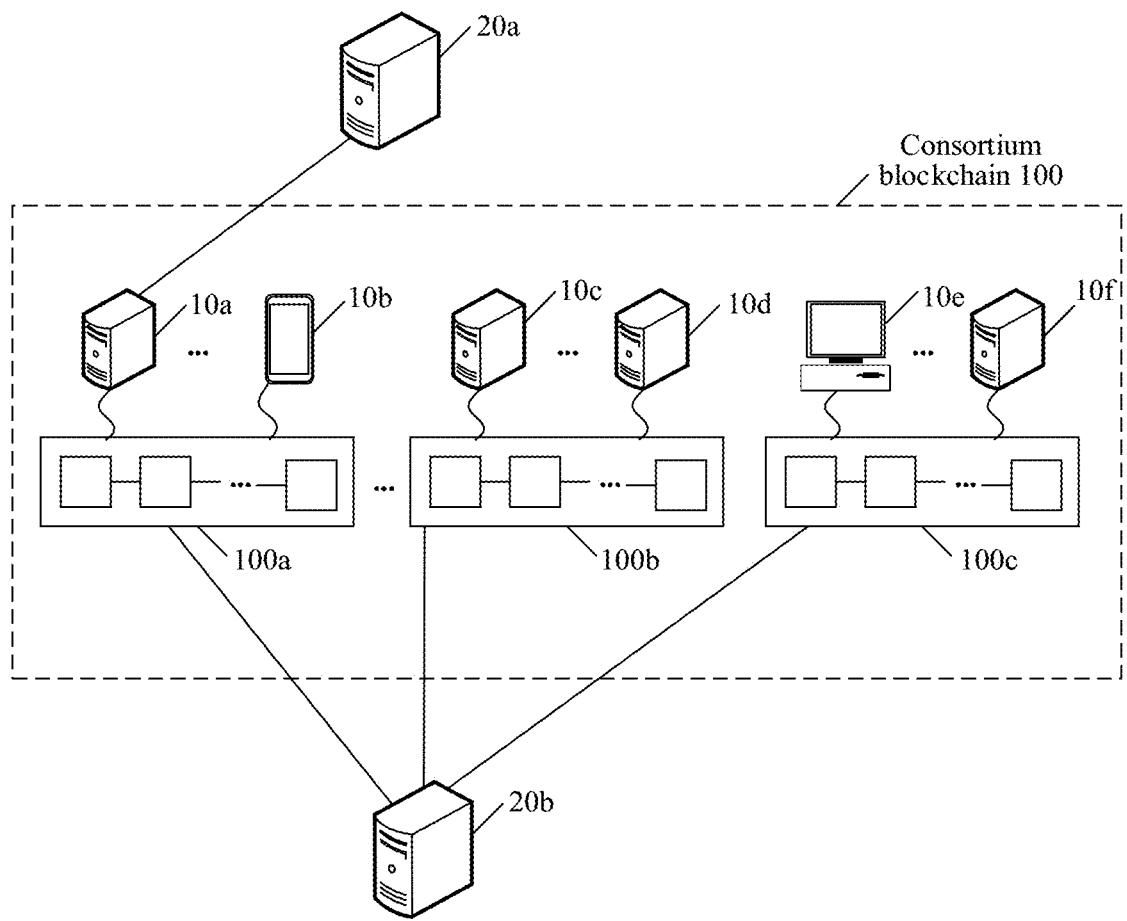
FIG. 1A is a schematic diagram of a network architecture according to some embodiments.

The technical solutions in the embodiments are clearly and completely described in the following with reference to the accompanying drawings in the embodiments of the disclosure. The described embodiments are merely some rather than all of the embodiments of the disclosure. All other embodiments obtained by a person of ordinary skill in the art based on the embodiments the disclosure without creative efforts shall fall within the protection scope of the disclosure.

Unless otherwise defined, meanings of all technical and scientific terms used in this specification are the same as those usually understood by a person skilled in the art. Terms used in this specification are merely intended to describe objectives of the embodiments, but are not intended to limit the disclosure.

Before the embodiments are further described in detail, a description is made on terms in the embodiments, and the terms in the embodiments are applicable to the following explanations.

1. Blockchain: in a narrow sense, the blockchain is a chain data structure with a block as a basic unit. In blocks, previously obtained transaction history is verified by using digital digests, which is suitable for requirements of tamper proof and scalability in a distributed ledger scenario. In a broad sense, the blockchain further refers to a distributed ledger technology implemented by a blockchain structure, which includes distributed consensus, privacy and security protection, a peer-to-peer communication technology, an Internet protocol, a smart contract, and the like. The blockchain aims to implement a distributed data recording ledger. Only adding is allowed and deletion is not allowed in the ledger. A bottom basic structure of the ledger is a linear linked list. The linked list is formed by blocks. Hash values of predecessor blocks are recorded in subsequent blocks, and whether each block (and a transaction in the block) is valid may be quickly verified by calculating a hash value. If a node in a network proposes to add a new block, consensus confirmation needs to be reached on the block by using a consensus mechanism.

2. Blockchain network is a network formed by a plurality of nodes, and each complete node (or referred to as a full node) may maintain a blockchain.

3. Consortium blockchain is a cluster formed by a plurality of private blockchains and is jointly managed by a plurality of institutions. Each institution manages one or more nodes, and data of the one or more nodes is allowed to be read and written and transmitted by only different institutions in a system. Each node in the consortium blockchain usually has a corresponding entity institution, which can join and exit a network after being authorized, and the institutions form a consortium of relevant interest, to jointly maintain the healthy operation of the blockchains.

4. Hash value, also referred to as an information feature value or a feature value, is generated by converting input data of any length into a password by using a hash algorithm and performing a fixed output. Original input data cannot be retrieved by decrypting a hash value, and the hash value is a one-way encryption function. In the blockchain, each block (other than an initial block) includes a hash value of a predecessor block. The predecessor block is referred to as a parent block of a current block. The hash value is the core foundation and the most important aspect of a potential of a blockchain technology and preserves the authenticity of recording and viewing data as well as the integrity of blockchain as a whole.

5. Asymmetric signature, the algorithm includes two keys: a public key and a private key. The public key and the private key are one pair. If data is signed by using a private key, the signature is verified by using only a corresponding public key. Because two different keys are respectively used in the signing process and the signature verification process, the algorithm is referred to as the asymmetric signature. A basic process of implementing confidential information exchange by using the asymmetric signature may be that: a party A generates a pair of keys and publishes a public key. When the party A needs to transmit information to another role (a party B), the party A signs the confidential information by using a private key and then transmits the signed confidential information to the party B. The party B performs signature verification on the signed information by using the public key of the party A.

6. Cross-chain data transmission is a technology that safely and reliably transfers transaction data D (or service information I, or a service message M) on a blockchain A to a blockchain B and produces a desired effect on the blockchain B.

7. Cross-chain trust transfer is a kind of multi-chain mutual trust technology implemented for avoiding many repeated verifications when a data authorizer performs identity verification on a plurality of blockchains to authorize a query permission for transaction data.

8. Lightweight node, or referred to as a light client or a simple payment verification client, is a node that has only a consensus verification function and does not store a blockchain locally.

FIG. 1A is a schematic diagram of a network architecture according to some embodiments. As shown in FIG. 1A, the network architecture may include a user terminal cluster and a blockchain node cluster in a consortium blockchain 100. The user terminal cluster may include a user terminal 20a and a user terminal 20b, and the blockchain node cluster may include a blockchain node 10a, a blockchain node 10b, a blockchain node 10c, a blockchain node 10d, a blockchain node 10e, and a blockchain node 10f. It may be understood that the user terminal cluster may include one or more user terminals. A quantity of user terminals is not limited in this embodiment.

Communication connections may exist among the blockchain node cluster. For example, the blockchain node 10a is in the communication connection with the blockchain node 10c, and the blockchain node 10a is in the communication connection with the blockchain node 10d. Communication connections may exist among the user terminal cluster, and any blockchain node in the blockchain node cluster may be in the communication connection with any user terminal in the user terminal cluster. For example, the blockchain node 10a is in the communication connection with the user terminal 20a, the blockchain node 10d is in the communication connection with the user terminal 20a, the blockchain node 10c is in the communication connection with the user terminal 20b, and the blockchain node 10d is in the communication connection with the user terminal 20b. A connection manner is not limited for the communication connection and may be direct or indirect connection through wired communication, or direct or indirect connection through wireless communication, or in another manner. This is not limited thereto.

In some embodiments, one or more blockchains are unified, to form the consortium blockchain 100. A quantity of blockchains in the consortium blockchain 100 is not limited in this embodiment. Referring to FIG. 1a again, the consortium blockchain 100 may include a blockchain 100a, a blockchain 100b, and a blockchain 100c. The blockchain node 10a and the blockchain node 10b correspond to the blockchain 100a (herein "the blockchain node 10a and the blockchain node 10b correspond to the blockchain 100" means that the blockchain node 10a and the blockchain node 10b and the blockchain 100a belong to a same blockchain network, the blockchain node 10a the blockchain node 10b complete operations such as consensus verification and query based on the blockchain 100a, and "a node corresponds to a blockchain" below is similar), the blockchain node 10c and the blockchain node 10d correspond to the blockchain 100b, and the blockchain node 10e, and the blockchain node 10f correspond to the blockchain 100c. It may be understood that the blockchain nodes (for example, the blockchain node 10a, the blockchain node 10b, the blockchain node 10c, the blockchain node 10d, the blockchain node 10e, and the blockchain node 100 may be respectively configured to maintain corresponding blockchains. All the blockchain 100a, the blockchain 100b, and the blockchain 100c may be understood as a distributed system. In the distributed system, any device such as a server or a user terminal may be added to a blockchain network to become a node in the blockchain network (for example, the blockchain 100a, the blockchain node 10a, and the blockchain node 10b may form a blockchain network. In this case, a new device may be added to the blockchain network after being authenticated successfully to become a node in the blockchain network).

Figure 1B:
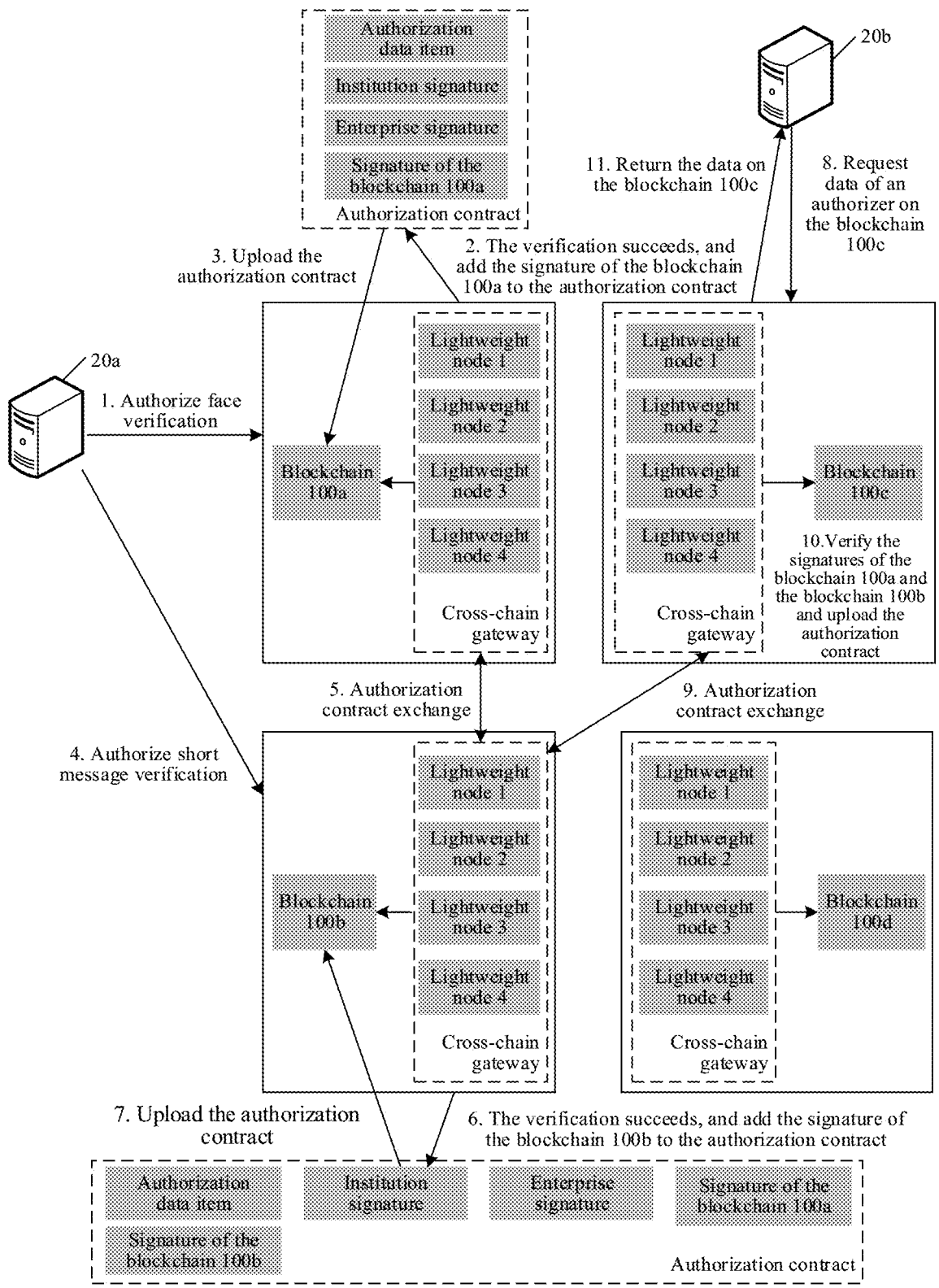
FIG. 1B is a schematic diagram of a blockchain-based data processing scenario according to some embodiments.

The user terminal in the user terminal cluster may transmit a request to the blockchain in the consortium blockchain 100 through the communication connection for performing service data authorization or obtaining service data. A description is made below by using an example in which the user terminal 20a is an authorization terminal corresponding to an authorizer and the user terminal 20b is a query terminal corresponding to a querier. FIG. 1B is a schematic diagram of a blockchain-based data processing scenario according to some embodiments. A consortium blockchain shown in FIG.

1B includes four blockchains, which are a blockchain 100a, a blockchain 100b, a blockchain 100c, and a blockchain 100d respectively.

It may be understood that each blockchain in the consortium blockchain has a private-public key pair and a chain identifier exclusive to the blockchain. Data exchange between the blockchains in the consortium blockchain may be implemented based on the chain identifiers and a cross-chain gateway. Referring to Table 1, Table 1 is a list of chain identifiers respectively corresponding to the blockchains in the consortium blockchain.

TABLE 1

| Name of blockchain | Chain identifier |
| --- | --- |
| Blockchain 100a | 117.114.151.174 |
| Blockchain 100b | 117.116.189.145 |
| Blockchain 100c | 117.116.155.123 |
| Blockchain 100d | 119.123.789.258 |

The chain identifier may be an Internet Protocol (IP) address and any other information that can be used for identifying the blockchain. Only an IP address is used as an example for description in Table 1.

The blockchain 100a may correspond to at least one blockchain node such as a verification node or a query node that is configured to perform a communication connection with the user terminal cluster, for example, a lightweight node 1 in a cross-chain gateway shown in FIG. 1b. The lightweight node 1 is specially configured to perform data exchange between the blockchain 100a and another blockchain in the consortium blockchain. The data exchange may include that the blockchain 100a broadcasts an own public key and a chain identifier 117.114.151.174 to the another blockchain, or may include that the blockchain 100a receives and stores a public key and a chain identifier of the another blockchain, or may include that the blockchain 100a broadcasts data on the blockchain to the another blockchain. Content of the data exchange is not limited herein and may be set according to an actual application scenario. Similarly, the blockchain 100b may correspond to a lightweight node 2 (that is, the blockchain 100b is maintained by using the lightweight node 2), the blockchain 100c may correspond to a lightweight node 3 (that is, the blockchain 100c is maintained by using the lightweight node 3), and the blockchain 100d may correspond to a lightweight node 4 (that is, the blockchain 100d is maintained by using the lightweight node 4). The functions of the lightweight nodes are consistent with the function of the lightweight node 1 corresponding to the blockchain 100a, therefore, details are not described herein again.

An enterprise may include service data of a plurality of types such as enterprise tax data, social insurance data, and business data. Service data of different types is stored in different blockchains, and a plurality of blockchains are unified, to form a consortium blockchain. To ensure security and privacy of the service data, when the service data of the enterprise is stored in the blockchains in the consortium blockchain, the enterprise, as an authorizer, may give (indicate) a permission to use the service data to the blockchains (for example, the blockchain 100a, the blockchain 100b, the blockchain 100c, and the blockchain 100d shown in FIG. 1B) in the consortium blockchain. That is, when a data user queries or obtains the data by using a blockchain, to ensure the security of the service data, the enterprise needs to authorize the service data to the blockchain, so that the blockchain provides a query permission to the data user according to authorized content.

In some embodiments, a rule on which a consensus is reached in the consortium blockchain is that provided that two blockchains in the consortium blockchain have verified a data authorization certificate of the authorizer and both approve the data authorization certificate, any blockchain in the consortium blockchain may accept a data query request of the user terminal 20b. A specific process in which the authorizer authorizes the service data and a specific process in which the data user obtains the service data refer to FIG. 1B.

Operation 1 to operation 3. The authorizer first performs authorization verification on the blockchain 100a by using the user terminal 20a, that is, performs identity authentication through face recognition shown in the figure, and the blockchain 100a signs the data authorization certificate by using an own private key after successfully verifying a face and performs uploading on the signed data authorization certificate. Obviously, the data authorization certificate in FIG. 1B is a data authorization contract. The data authorization contract may include an authorization data item, an institution signature, and an enterprise signature. The authorization data item may include the service data authorized to each blockchain. For example, the tax data of the enterprises is stored in the blockchain 100a, and the authorization data item may include the tax data authorized to the blockchain 100a. The institution signature may include a signature of the data user on the authorization data item by using a private key. In an actual application, the data user may be a management platform of managing the authorizer or may be an enterprise cooperating with the authorizer. This is not limited herein. The enterprise signature is a signature of the authorizer on the data authorization item by using a private key.

Operation 4 to operation 7. The authorizer performs authorization verification on the blockchain 100b, which is implemented by verifying a mobile phone short message reserved by the authorizer in the blockchain 100b shown in the figure, and after successfully verifying the short message, the blockchain 100b obtains, by using the cross-chain gateway, the data authorization contract (that is, the data authorization certificate) that is signed by the blockchain 100a from the blockchain 100a, and then verifies validity of the signature of the blockchain 100a, and the blockchain 100b signs the data authorization contract by using an own private key after determining that the signature of the blockchain 100a is a valid signature and performs uploading on the signed data authorization contract. For example, the blockchain 100b performs uploading on the signature of the blockchain 100a, the signature of the blockchain 100b, and the data authorization contract simultaneously. It may be understood that in some embodiments, in operation 1 and operation 4, the verification manner is described by taking face verification and short message verification as an example. In an actual application, the verification manner is not limited.

Operation 8 to operation 11. Assuming that the social insurance data of the authorizer is stored in the blockchain 100c in the consortium blockchain, when wanting to obtain the social insurance data of the authorizer, the data user needs to apply the blockchain 100c, and after obtaining a data query request transmitted by the user terminal 20b, the blockchain 100c first obtains, by using the cross-chain gateway, the signature of the blockchain 100a and the data authorization contract signed by the blockchain 100b from the blockchain 100b, then performs signature verification on the signature of the blockchain 100a according to a public key of the blockchain 100a, and verifies the signature of the blockchain 100b according to a public key of the blockchain 100b, and the blockchain 100c may consider that the authorizer has performed authorization after the signature verification on the two signatures succeeds, performs uploading on the data authorization contract, and finally returns the social insurance data to the user terminal 20b corresponding to the data user according to a data authorization range of the data authorization contract. It may be understood that in some embodiments, the blockchain 100c obtains the signature of the blockchain 100a and the data authorization contract signed by the blockchain 100b from the blockchain 100b. In an actual application, the blockchain 100c may obtain the data authorization contract signed by the blockchain 100b from the blockchain 100b and obtain the data authorization contract signed by the blockchain 100a from the blockchain 100a. A subsequent process is consistent with the foregoing description.

Based on the foregoing, this embodiment provides a solution for implementing cross-chain trust transfer between a plurality of blockchains based on a multi-consensus mechanism, so that through few times of authorization, the authorizer can cause the data user to obtain the service data from any blockchain in the consortium blockchain, In the foregoing, the consortium blockchain includes four blockchains and two blockchains authorized by the authorizer, which is merely an example of this embodiment. It may be understood that the consortium blockchain includes M blockchains, and after N blockchains in the consortium blockchain are authorized by the authorizer, the data user may obtain service data within an authorization range from any blockchain in the consortium blockchain, N being a quantity of blockchains meeting a consensus rule in the consortium blockchain, $1 \leq N \leq M$, and both N and M being positive integers.

It may be understood that in the specification, claims, and accompanying drawings of the embodiments of the present invention, the terms "a", "b", "A", "B", and the like for the blockchain are intended to distinguish between different objects but do not indicate a particular order. In addition, the terms "include" and any variant thereof are intended to cover a non-exclusive inclusion.

It may be understood that the method provided in the embodiment corresponding to FIG. 1A and FIG. 1B may be performed by a computer device, and the computer device includes, but not limited to, a user terminal or a server. In some embodiments, the blockchain node 10a, the blockchain node 10b, the blockchain node 10c, the blockchain node 10d, the blockchain node 10e, or the blockchain node 10f may be the computer device. The server may be a stand-alone physical server, or may be a server cluster or distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform. The user terminal may be a smartphone, a tablet computer, a notebook computer, a desktop computer, a smart speaker, a smart TV, a smartwatch, or the like, but is not limited thereto. Quantities of user terminals and servers are not limited, and the terminal and the server may be directly or indirectly connected through wired or wireless communication, which is not limited in some embodiments.

Figure 2:
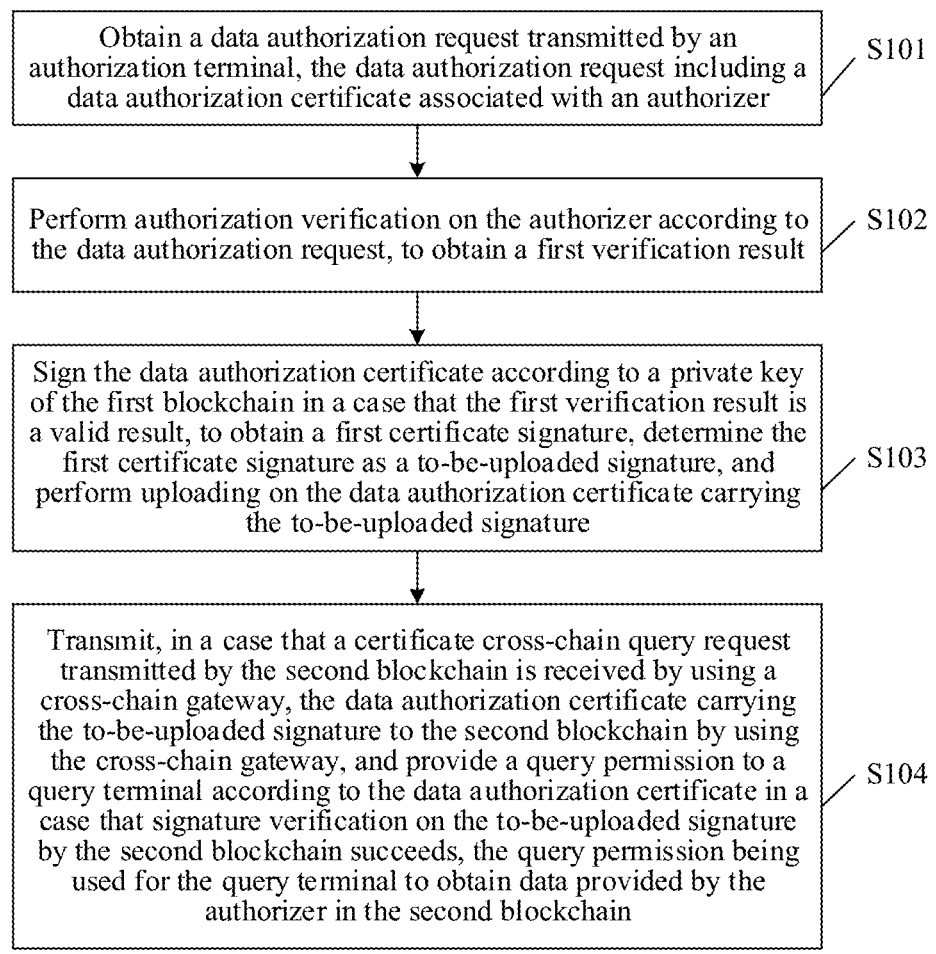
FIG. 2 is a schematic flowchart of a blockchain-based data processing method according to some embodiments.

In some embodiments, FIG. 2 is a schematic flowchart of a blockchain-based data processing method according to some embodiments. The blockchain-based data processing method is performed by a verification node, the verification node corresponds to a first blockchain (for example, a blockchain A, that is, the verification node and the blockchain A belongs to a same blockchain network, and the verification node completes operations such as consensus verification and query based on the blockchain A) in a consortium blockchain, and the consortium blockchain further includes a second blockchain (for example, a blockchain B). As shown in FIG. 2, the data processing method includes the following operations.

Operation S101. Obtain a data authorization request transmitted by an authorization terminal, the data authorization request including a data authorization certificate associated with an authorizer.

Figure 3A:
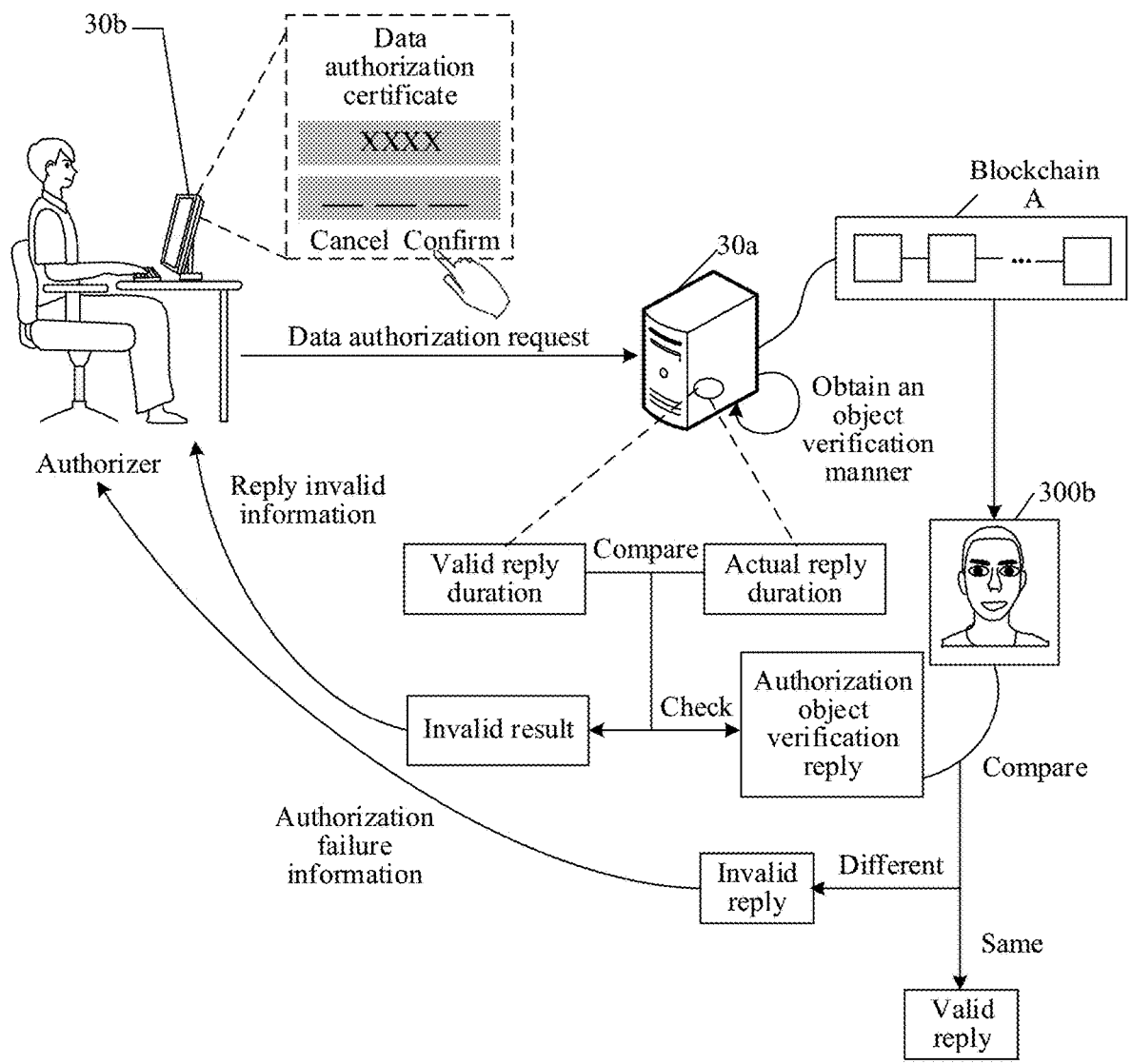
FIG. 3A is a schematic diagram of a blockchain-based data processing scenario according to some embodiments.

For example, FIG. 3A is a schematic diagram of a blockchain-based data processing scenario according to some embodiments. As shown in FIG. 3A, an authorizer transmits a data authorization request to a verification node 30a in the first blockchain (for example, the blockchain A) by using an authorization terminal 30b. The data authorization request carries a data authorization certificate, and the certificate may include information about the authorizer, information about a data user, and service data stored in the consortium blockchain (the service data is authorized by the authorizer). For specific data of the data authorization certificate, reference may be made to the description in the embodiment corresponding to FIG. 1B, and details are not described herein again.

Operation S102. Perform authorization verification on the authorizer according to the data authorization request, to obtain a first verification result.

For example, an authorization object verification request is transmitted to the authorization terminal according to the data authorization request, and a transmitting timestamp of transmitting the authorization object verification request is recorded. An authorization object verification reply returned by the authorization terminal is obtained, and an obtaining timestamp of obtaining the authorization object verification reply is recorded. A valid reply duration for the authorization object verification request is obtained, and an actual reply duration of the authorizer is determined according to the transmitting timestamp and the obtaining timestamp (for example, a difference between the obtaining timestamp and the transmitting timestamp is used as the actual reply duration). The first verification result (for example, a verification result A) is determined as an invalid result in a case that the actual reply duration is greater than the valid reply duration, and reply invalid information for the data authorization request is transmitted to the authorization terminal. Validity of the authorization object verification reply is checked in a case that the actual reply duration is less than or equal to the valid reply duration. The verification result A is determined as the invalid result in a case that the authorization object verification reply is an invalid reply, and authorization failure information for the data authorization request is transmitted to the authorization terminal. The verification result A is determined as the valid result in a case that the actual reply duration is less than or equal to the valid reply duration and the authorization object verification reply is a valid reply.

Referring to FIG. 3A again, after obtaining the authorization request transmitted by the authorization terminal 30*b*, the verification node 30*a* in the blockchain A obtains an object verification manner. It may be understood that the object verification manner may include face verification, real-time short message verification, fingerprint verification, password verification, and the like. The object verification manner is not limited herein. In addition, in some embodiments, the object verification manner such as face verification may be determined by using the verification node 30*a*, and then an authorization object verification request for the face verification is transmitted to the authorization terminal 30*b*, or the verification node 30*a* transmits triggers for the verification manners to the authorization terminal 30*b*, and the authorization terminal 30*b* determines the verification manner. A terminal (including the authorization terminal 30*b* and the verification node 30*a*) for determining the verification manner is also not limited herein.

Figure 3B:
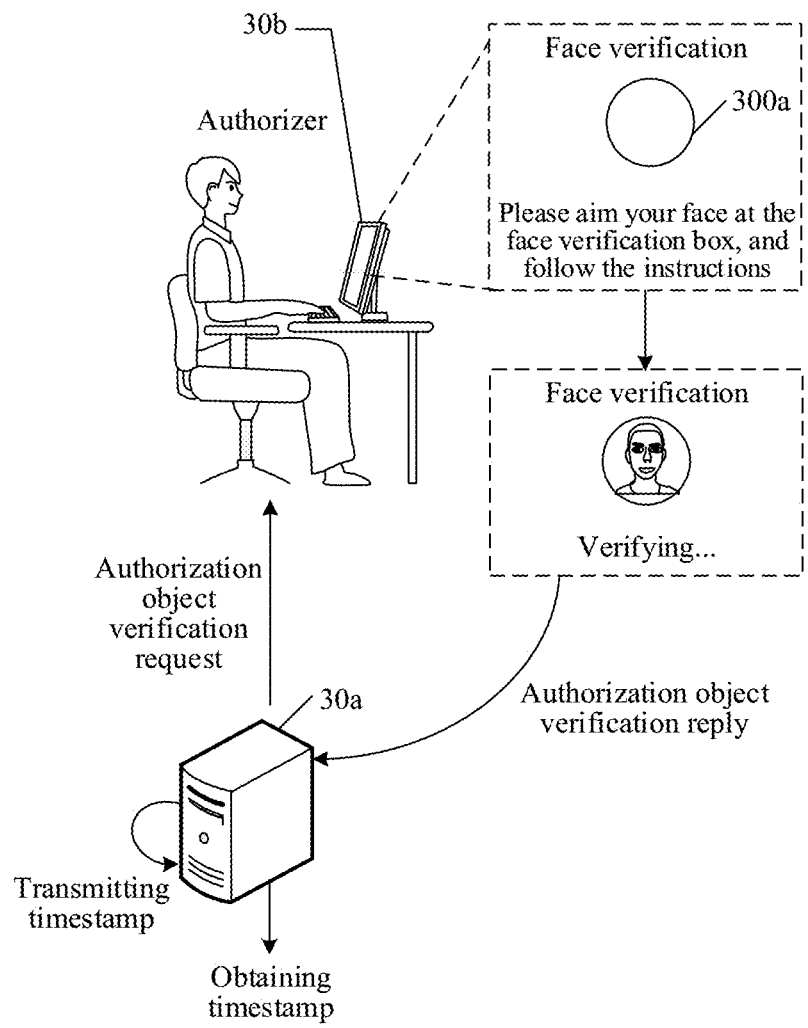
FIG. 3B is a schematic diagram of a blockchain-based data processing scenario according to some embodiments.

FIG. 3B is a schematic diagram of a blockchain-based data processing scenario according to some embodiments. As shown in FIG. 3*b*, the verification node 30*a* transmits an authorization object verification request to the authorization terminal 30*b*, and the verification node 30*a* records a transmitting timestamp of transmitting the authorization object verification request. Obviously, in some embodiments, a description is made by taking face verification as an example. After the authorization terminal 30*b* obtains the authorization object verification request, a display screen corresponding to the authorization terminal 30*b* may display a face verification prompt such as a face verification box 300*a* and a prompt "Please aim your face at the face verification box and follow the instructions", to prompt the authorizer of correctly verifying an identity. After obtaining a face of the authorizer, the authorization terminal 30*b* transmits an authorization object verification reply to the verification node 30*a*. As shown in FIG. 3*b*, the display screen corresponding to the authorization terminal 30*b* may display a prompt "Verifying".

When obtaining the authorization object verification reply, the verification node 30*a* records an obtaining timestamp of obtaining the authorization object verification reply. The verification node 30*a* records the transmitting timestamp and the obtaining timestamp, to ensure real-time performance of the authorization object verification reply and further improve security of the authorization object verification reply. Referring to FIG. 3A again, the verification node 30*a* may set a valid reply duration for the authorization object verification request. It is assumed that the verification node 30*a* transmits the authorization object verification request to the authorization terminal 30*b* at 2:00 p.m., and obtains the authorization object verification reply returned by the authorization terminal 30*b* at 2:01 p.m., it may be determined that an actual reply duration of the authorizer is one minute. If the valid reply duration set by the verification node 30*a* is 50 seconds, it may be determined that the authorization object verification reply is invalid, and further it may be determined that a verification result A of the authorization object verification request is an invalid result. In this case, the verification node 30*a* may transmit reply invalid information to the authorization terminal 30*b*, so that the authorization terminal 30*b* performs subsequent operations such as a secondary reply. If the valid reply duration set by the verification node 30*a* is 70 seconds, it may be determined that the reply duration is valid. In this case, validity of the authorization object verification reply is checked. As shown in FIG. 3A, the verification node 30*a* may obtain a face image 300*b* of the authorizer on which uploading has been performed from the blockchain A, and then compare a face image in the authorization object verification reply with the face image 300*b*. If an object included in the face image in the authorization object verification reply is the same as an object (for example, the authorizer) in the face image 300*b*, the verification node 30*a* may determine the authorization object verification reply as a valid reply, and may further determine the verification result A of the current authorization object verification request as a valid result. If the object included in the face image in the authorization object verification reply is different from the object in the face image 300*b*, the verification node 30*a* may determine the authorization object verification reply as an invalid reply, and may further determine the verification result A of the current authorization object verification request as the invalid result. In this case, the verification node 30*a* transmits authorization failure information for the data authorization request to the authorization terminal 30*b*.

In this operation, the verification node 30*a* first checks the reply duration and then compares the face images to determine the verification result A. However, in an example embodiment, the verification node 30*a* may first check the object included in the face image in the authorization object verification reply and the object in the face image 300*b*. If the objects in the two face images are inconsistent, the verification node 30*a* may determine the verification result A as the invalid result. If the objects in the two face images are consistent, the verification node 30*a* checks the valid reply duration and the actual reply duration, to determine the validity of the verification result A.

Operation S103. Sign the data authorization certificate according to a private key of the first blockchain in a case that the first verification result is a valid result, to obtain a first certificate signature, determine the first certificate signature as a to-be-uploaded signature, and perform uploading on the data authorization certificate carrying the to-be-uploaded signature.

Specifically, the consortium blockchain further includes a third blockchain (for example, a blockchain C), and the blockchain C is a blockchain that has accepted the data authorization request. A third certificate signature (for example, a certificate signature C) corresponding to the data authorization certificate is obtained from the blockchain C by using the cross-chain gateway in a case that the verification result A is the valid result, the certificate signature C being obtained by signing the data authorization certificate by a node corresponding to the blockchain C according to a private key of the blockchain C in a case that a second verification result (for example, a verification result C) for the authorizer is the valid result. A first hash value corresponding to the data authorization certificate is obtained. The certificate signature C is decrypted according to a public key of the blockchain C, to obtain a second hash value. The first hash value is compared with the second hash value. A signature verification result includes a successful signature verification result and a failed signature verification result. The signature verification result is determined as the successful signature verification result in a case that the first hash value is the same as the second hash value. The signature verification result is determined as the failed signature verification result in a case that the first hash value is different from the second hash value. In a case that the signature verification result is the failed signature verification result, authorization failure information for the data authorization request is transmitted to the authorization terminal, and signature verification failure information is transmitted to the blockchain C by using the cross-chain gateway, so that the blockchain C detects the certificate signature C. The data authorization certificate is signed according to the private key of the blockchain A in a case that the signature verification result is the successful signature verification result, to obtain the certificate signature A, and the certificate signature A and the certificate signature C are determined as the to-be-uploaded signatures.

Operation S104. Transmit, in a case that a certificate cross-chain query request transmitted by the second blockchain is received by using a cross-chain gateway, the data authorization certificate carrying the to-be-uploaded signature to the second blockchain by using the cross-chain gateway. A query permission is provided to a query terminal according to the data authorization certificate in a case that signature verification on the to-be-uploaded signature by the second blockchain succeeds, the query permission being used for the query terminal to obtain data provided by the authorizer in the second blockchain.

For example, the cross-chain gateway includes a second lightweight node (for example, a lightweight node B) corresponding to the second blockchain (for example, the blockchain B) and a first lightweight node (for example, a lightweight node A) corresponding to the blockchain A. The lightweight node A includes a chain identifier of the blockchain B. The chain identifier of the blockchain B is obtained in a case that the certificate cross-chain query request transmitted by the lightweight node B corresponding to the blockchain B is received by using the lightweight node A. The chain identifier of the blockchain B and the data authorization certificate carrying the to-be-uploaded signature is transmitted to the lightweight node A, so that the lightweight node A transmits the data authorization certificate carrying the to-be-uploaded signature to the lightweight node B in the blockchain B according to the chain identifier of the blockchain B.

For example, for a specific process of operation S103 and operation S104, reference may be made to the description in the embodiment corresponding to FIG. 1B, or reference may be made to a description in the embodiment corresponding to FIG. 4 below. Details are not described herein again.

For example, a public key of the blockchain A and a chain identifier of the blockchain A are broadcasted to the consortium blockchain by using the cross-chain gateway, so that remaining blockchains in the consortium blockchain perform uploading on the public key of the blockchain A and the chain identifier of the blockchain A. The remaining blockchains are blockchains other than the blockchain A in the consortium blockchain. Public keys of the remaining blockchains and chain identifiers of the remaining blockchains are obtained by using the cross-chain gateway, and uploading is performed on the public keys of the remaining blockchains and the chain identifiers of the remaining blockchains.

Figure 3C:
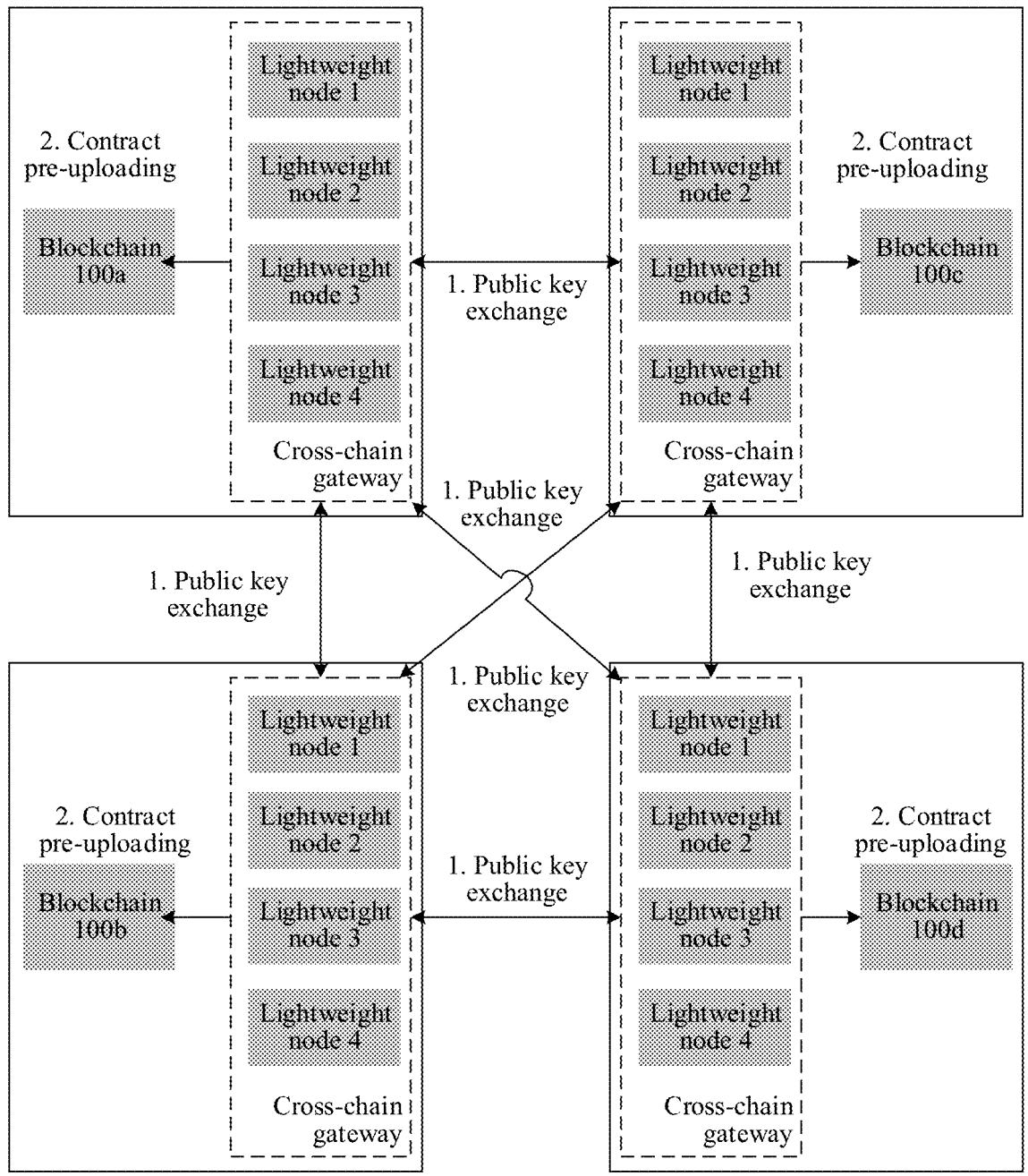
FIG. 3C is a schematic diagram of a blockchain-based data processing scenario according to some embodiments.

In some embodiments, the consortium blockchain is generated by unifying at least one blockchain. FIG. 3C is a schematic diagram of a blockchain-based data processing scenario according to some embodiments. As shown in FIG. 3C, a consortium blockchain include four blockchains, which are a blockchain 100a, a blockchain 100b, a blockchain 100c, and a blockchain 100d respectively. At the beginning of forming a consortium, a blockchain node specially configured to perform data exchange in the consortium blockchain is determined from each blockchain. It is assumed that in the blockchain 100a, a lightweight node 1 is used as a node in the blockchain 100a for performing data exchange with another blockchain in the consortium blockchain. In the blockchain 100b, a lightweight node 2 is used as a node in the blockchain 100b for performing data exchange with another blockchain in the consortium blockchain. In the blockchain 100c, a lightweight node 3 is used as a node in the blockchain 100c for performing data exchange with another blockchain in the consortium blockchain. In the blockchain 100d, a lightweight node 4 is used as a node in the blockchain 100d for performing data exchange with another blockchain in the consortium blockchain. Therefore, the lightweight node 1, the lightweight node 2, the lightweight node 3, and the lightweight node 4 form a cross-chain gateway, and all the data exchange in the consortium blockchain passes through the cross-chain gateway, to effectively avoid tampering and forging.

A blockchain A may be any blockchain in FIG. 3C. In some embodiments, a description is made by using the blockchain 100a as the blockchain A. The blockchain 100a broadcasts a public key of the blockchain 100a and a chain identifier of the blockchain 100a to the consortium blockchain by using the cross-chain gateway, so that the blockchain 100b, the blockchain 100c, and the blockchain 100d in the consortium blockchain perform uploading on the public key of the blockchain 100a and the chain identifier of the blockchain 100a. Similarly, the blockchain 100a obtains public keys and chain identifiers respectively corresponding to the blockchain 100b, the blockchain 100c, and the blockchain 100d by using the cross-chain gateway and performs uploading on the public keys and the chain identifiers, that is, contract pre-uploading. For specific processes of data exchange between the remaining blockchains and contract pre-uploading, reference may be made to the description of the blockchain 100a. Details are not described herein again.

Figure 4:
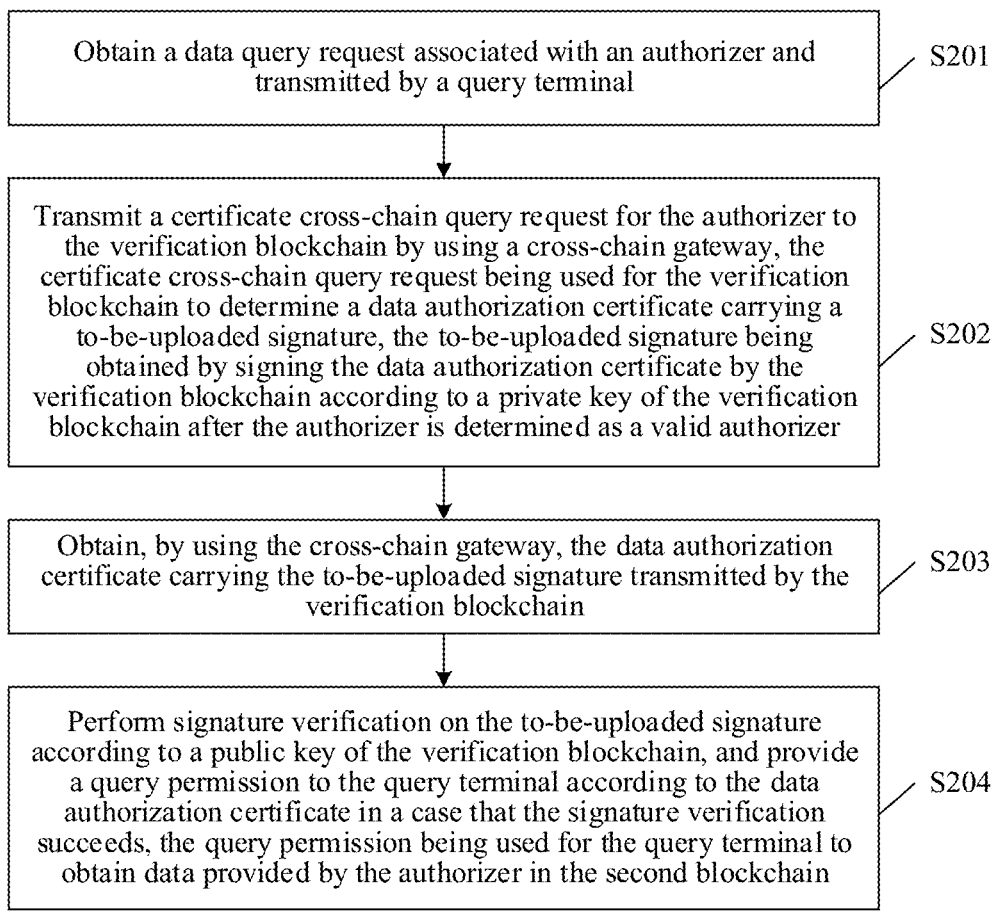
FIG. 4 is a schematic flowchart of a blockchain-based data processing method according to some embodiments.

FIG. 4 is a schematic flowchart of a blockchain-based data processing method according to some embodiments. The blockchain-based data processing method is performed by a query node, the query node corresponds to a second blockchain (for example, a blockchain B) in a consortium blockchain, and the consortium blockchain further includes a verification blockchain. As shown in FIG. 4, the data processing method includes the following operations.

Operation S201. Obtain a data query request associated with an authorizer and transmitted by a query terminal.

For example, the data query request includes a chain identifier of the verification blockchain. The verification blockchain is a blockchain including a valid verification result of the data authorization certificate in the consortium blockchain. A verification quantity of verification blockchains in the consortium blockchain is determined according to the chain identifier of the verification blockchain. Data query failure information is transmitted to the query terminal in a case that the verification quantity is less than a verification quantity threshold. In a case that the verification quantity is greater than or equal to the verification quantity threshold, the operation of transmitting a certificate cross-chain query request for the authorizer to the verification blockchain by using a cross-chain gateway is performed.

For example, a public key of the blockchain B and a chain identifier of the blockchain B are broadcasted to the consortium blockchain by using a cross-chain gateway, so that remaining blockchains in the consortium blockchain perform uploading on the public key of the blockchain B and the chain identifier of the blockchain B. The remaining blockchains are blockchains other than the blockchain B in the consortium blockchain. Public keys of the remaining blockchains and chain identifiers of the remaining blockchains are obtained by using the cross-chain gateway, and uploading is performed on the public keys of the remaining blockchains and the chain identifiers of the remaining blockchains.

Figure 5A:
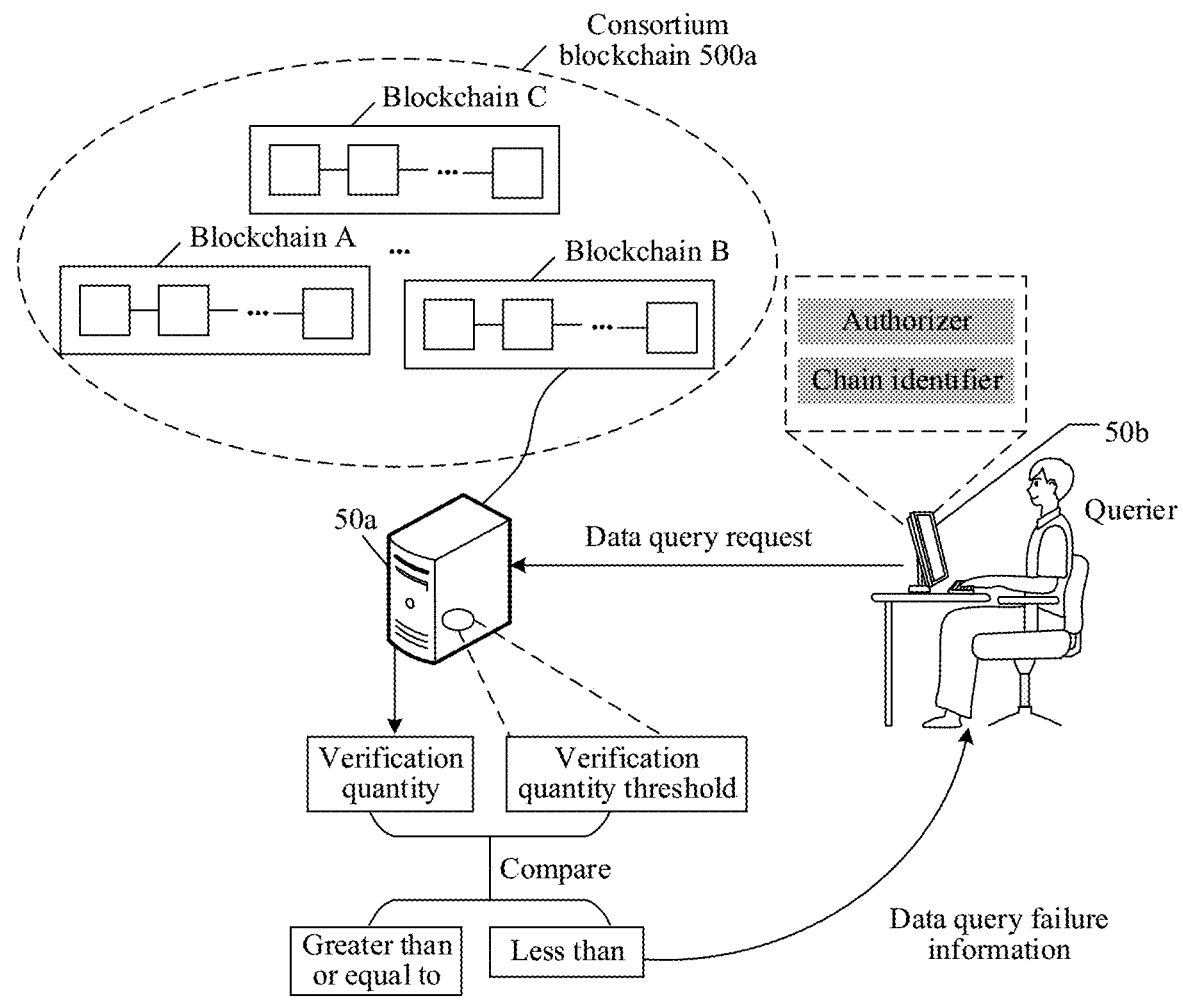
FIG. 5A is a schematic diagram of a blockchain-based data processing scenario according to some embodiments.

FIG. 5A is a schematic diagram of a blockchain-based data processing scenario according to some embodiments. As shown in FIG. 5A, a querier transmits, by using a query terminal 50*b*, a data query request to a query node 50*a* corresponding to a blockchain B in a consortium blockchain 500*a* to which the querier belongs. The data query request carries information about an authorizer and carries a chain identifier of a verification blockchain. The consortium blockchain 500*a* may include a blockchain A, a blockchain B, and a blockchain C. It is assumed that the blockchain A and the blockchain C are verification blockchains in the consortium blockchain 500*a*.

The query node 50*a* determines a verification quantity, that is, 2, of verification blockchains in the consortium blockchain 500*a* according to a chain identifier of the blockchain A and a chain identifier of the blockchain C. The query node 50*a* compares the verification quantity with a verification quantity threshold set by a system. If the verification quantity is less than the verification quantity threshold (it is assumed that the verification quantity threshold is 3), the query node 50*a* transmits data query failure information to the query terminal 50*b*. If the verification quantity is greater than or equal to the verification quantity threshold, the query node 50*b* performs operation S202 to operation S204.

Operation S202. Transmit a certificate cross-chain query request for the authorizer to the verification blockchain by using a cross-chain gateway, the certificate cross-chain query request being used for the verification blockchain to determine a data authorization certificate carrying a to-be-uploaded signature, the to-be-uploaded signature being obtained by signing the data authorization certificate by the verification blockchain according to a private key of the verification blockchain after the authorizer is determined as a valid authorizer.

Figure 5B:
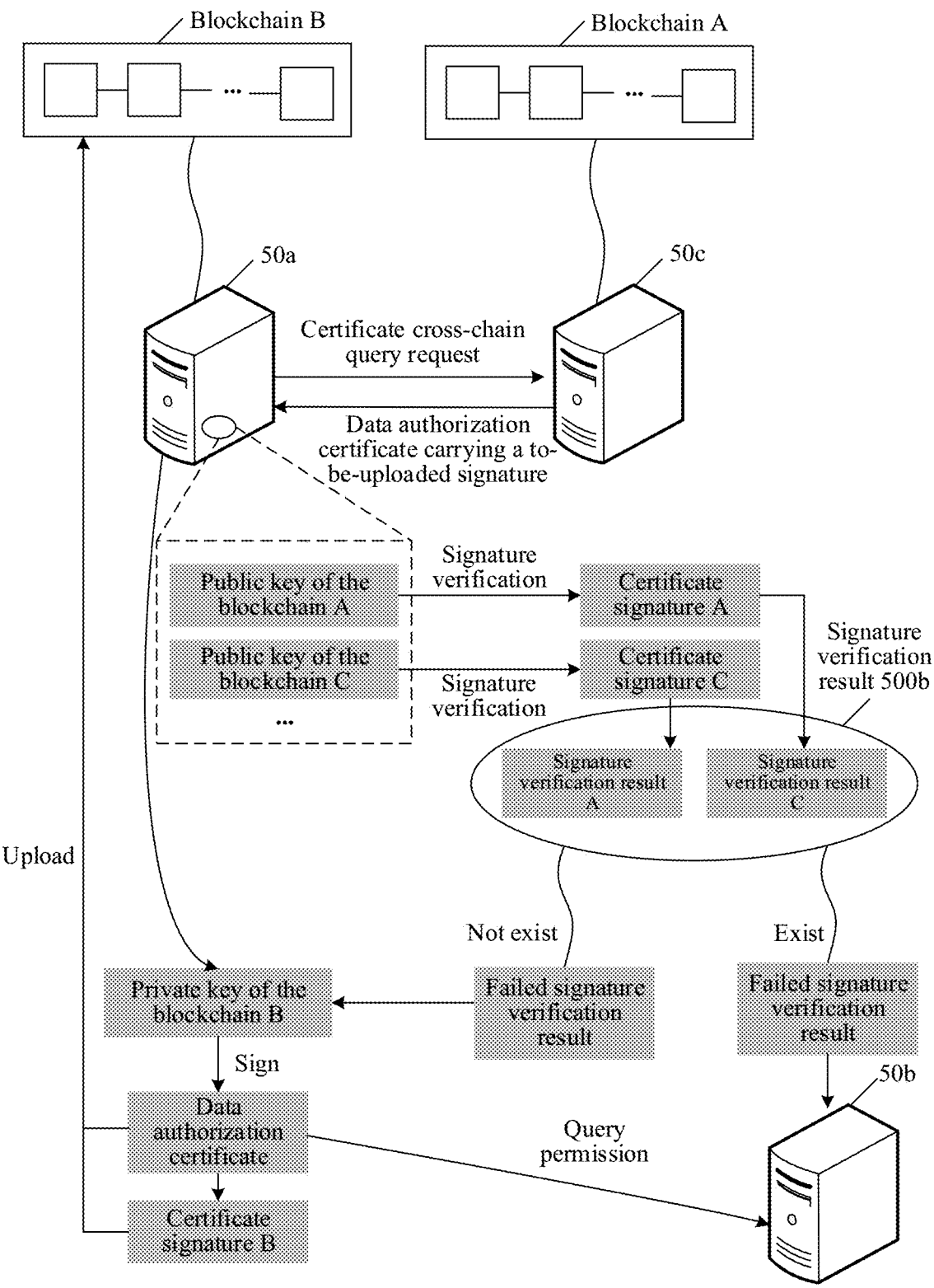
FIG. 5B is a schematic diagram of a blockchain-based data processing scenario according to some embodiments.

For example, in this embodiment, a description is made by taking the blockchain A as an example, when the verification blockchain is another blockchain in the consortium blockchain 500*a*, reference may be made to a description below. FIG. 5B is a schematic diagram of a blockchain-based data processing scenario according to some embodiments. A verification node 50*c* shown in FIG. 5B may be equivalent to the verification node 30*a* in the embodiment corresponding to FIG. 2. As shown in FIG. 5B, the verification node 50*c* corresponds to the blockchain A (that is, the verification node 50*a* is configured to maintain the blockchain A). When obtaining, by using a cross-chain gateway, a certificate cross-chain query request for the authorizer transmitted by the query node 50*a*, the verification node 50*a* transmits a data authorization certificate carrying a to-be-uploaded signature to the query node 50*a* by using the cross-chain gateway.

Operation S203. Obtain, by using the cross-chain gateway, the data authorization certificate carrying the to-be-uploaded signature transmitted by the verification blockchain.

Operation S204. Perform signature verification on the to-be-uploaded signature according to a public key of the verification blockchain, and provide a query permission to the query terminal according to the data authorization certificate in a case that the signature verification succeeds, the query permission being used for the query terminal to obtain data provided by the authorizer in the second blockchain.

For example, the verification blockchain includes a blockchain A and a third blockchain (for example, a blockchain C), and the to-be-uploaded signature includes a certificate signature A and a third certificate signature (for example, a certificate signature C). The certificate signature A is generated based on a private key of the blockchain A and the data authorization certificate, and the certificate signature C is generated based on a private key of the blockchain C and the data authorization certificate. Signature verification is performed on the certificate signature A according to the public key of the blockchain A, to obtain a signature verification result A, and signature verification is performed on the certificate signature C according to the public key of the blockchain C, to obtain a second signature verification result (for example, a signature verification result C). It is determined that the signature verification fails in a case that at least one of the signature verification result A and the signature verification result C is a failed signature verification result, and data query failure information is transmitted to the query terminal. It is determined that the signature verification succeeds in a case that both the signature verification result A and the signature verification result C are successful signature verification results, and the data authorization certificate is signed according to a private key of the blockchain B, to obtain a second certificate signature (for example, a certificate signature B). Uploading is performed on the certificate signature B and the data authorization certificate, and the query permission is provided to the query terminal according to the data authorization certificate after the uploading succeeds.

For example, a first hash value corresponding to the data authorization certificate is obtained. The to-be-uploaded signature is decrypted according to a public key of the verification blockchain, to obtain a second hash value. The first hash value is compared with the second hash value, and it is determined that the signature verification succeeds in a case that the first hash value is the same as the second hash value. It is determined that the signature verification fails in a case that the first hash value is different from the second hash value, and data query failure information is transmitted to the query terminal.

As shown in FIG. 5B, the to-be-uploaded signature includes a certificate signature A and a certificate signature C, and the blockchain B has stored public keys of other blockchains in the consortium blockchain 500*a*. Therefore, the query node 50*a* may obtain the public keys of the verification blockchains. It may be learned with reference to FIG. 5A and FIG. 5B that the verification blockchains are the blockchain A and the blockchain C. The query node 50*a* performs signature verification on the certificate signature A according to the public key of the blockchain A, and performs signature verification on the certificate signature C according to the public key of the blockchain C, to obtain a signature verification result 500*b*. As shown in FIG. 5B, the signature verification result 500*b* includes a signature verification result A and a signature verification result C.

It is determined that the signature verification fails if the signature verification result in the signature verification result 500*b* is a failed signature verification result (for example, it is determined that the signature verification fails when any one of the signature verification result A and the signature verification result C is the failed signature verification result). In this case, the query node 50*a* transmits data query failure information to the query terminal 50*b*. If both the signature verification results in the signature verification result 500b are successful signature verification results, the query node 50a determines that the signature verification succeeds, obtains a private key of the blockchain B, and signs the data authorization certificate by using the private key of the blockchain B, to obtain a certificate signature B. Uploading is performed on the certificate signature B and the data authorization certificate, and the query permission is provided to the query terminal 50b according to the data authorization certificate after the uploading succeeds.

It may be understood that in the embodiments corresponding to FIG. 2 and FIG. 4, the verification node and the query node may be any blockchain nodes in the blockchain A and the verification blockchain.

In some embodiments, a verification node corresponds to the blockchain A in the consortium blockchain. In addition, the consortium blockchain further includes the blockchain B. The verification node may obtain a data authorization request transmitted by an authorization terminal, the data authorization request including a data authorization certificate associated with an authorizer. It is to be understood that authorized data in the data authorization certificate is transaction data or service data, and the data is stored in the consortium blockchain. Further, the verification node may perform authorization verification on the authorizer according to the data authorization request, to obtain a verification result A. Further, the verification node may sign the data authorization certificate according to a private key of the blockchain A in a case that the verification result A is a valid result, to obtain a certificate signature A, then determine the certificate signature A as a to-be-uploaded signature, and finally perform uploading on the data authorization certificate carrying the to-be-uploaded signature. Further, when receiving, by using a cross-chain gateway, a certificate cross-chain query request transmitted by the blockchain B, the verification node may transmit the data authorization certificate carrying the to-be-uploaded signature to the blockchain B by using the cross-chain gateway, so that the blockchain B may perform signature verification on the to-be-uploaded signature, and in a case that the signature verification succeeds, the blockchain B may provide a query permission to a query terminal according to the data authorization certificate. The query permission is a permission of the query terminal to obtain service data provided by the authorizer in the blockchain B. It can be learned from the foregoing that the consortium blockchain includes at least two blockchains. The at least two blockchains includes the blockchain A and the blockchain B. An authorizer transmits a data authorization request to a verification node in the blockchain A, and the verification node may perform authorization verification on the authorizer according to the data authorization request, so that when a verification result A is a valid result, the verification node signs a data authorization certificate according to a private key of the blockchain A, to obtain a certificate signature A, to indicate that the authorizer passes the authorization verification in the blockchain A. Subsequently, when a data querier obtains, by using the blockchain B, data associated with the authorizer, although the blockchain B does not have a data authorization certificate (because the authorizer does not preform authorization verification on the blockchain B), the blockchain B may transmit a certificate cross-chain query request to the blockchain A by using a cross-chain gateway in the consortium blockchain, to obtain the data authorization certificate carrying a to-be-uploaded signature (for example, the certificate signature A). When signature verification on the to-be-uploaded signature by the blockchain B succeeds, the blockchain B may provide, according to the data authorization certificate transmitted by the blockchain A, service data authorized by the authorizer to the data querier. It may be understood that the solution provided in some embodiments may be used to improve the data authorization efficiency of the data authorizer in the consortium blockchain.

The following describes an example embodiment in an application scenario.

Generally, data of different entities is managed by the entities, but in some special cases, data of some entities (that is, data authorizers) needs to be authorized to other entities (that is, data users) for query. For example, to regulate management on enterprises, some institutions (for example, a tax supervision institution) need to regularly monitor relevant data of the enterprises.

For example, the data authorizer is an enterprise A. The enterprise A may include data of a plurality of types such as tax data, social insurance data, and business data. The data of different types may be stored in different blockchains, for example, the tax data is stored in a blockchain A, the social insurance data is stored in a blockchain B, and the business data is stored in a blockchain C. At a stage of authorization consensus, a manager of the enterprise A may first perform authorization verification on the blockchain A, for example, may perform authorization verification through face recognition. After face verification succeeds, the blockchain A may sign a data authorization certificate (that is, a data authorization contract, which includes a data authorization item, an institution signature, an enterprise signature, and the like) according to a private key of the blockchain A, and perform uploading on the signed data authorization certificate. Subsequently, the manager of the enterprise A may perform authorization verification on the blockchain B, for example, may perform authorization verification through short message verification. After short message verification succeeds, the blockchain B may obtain, by using a cross-chain gateway, the data authorization certificate signed by the blockchain A from the blockchain A. After verifying that the signature of the blockchain A is valid, the blockchain B may sign the data authorization certificate signed by the blockchain A again by using an own private key, and perform uploading on the signed data authorization certificate.

For example, the data user is an institution B (for example, a tax supervision institution). When the institution B needs to apply the blockchain C to obtain the business data of the enterprise A, the blockchain C may obtain, by using the cross-chain gateway, the data authorization certificate signed by the blockchain A and the blockchain B from the blockchain B, and then verify the corresponding signatures by using public keys of the blockchain A and the blockchain B. When the verification on the signatures succeeds, it may be considered that the enterprise A has performed authorization (that is, the manager of the enterprise A does not need to perform authorization verification on the blockchain C), and the blockchain C may directly return the business data of the enterprise A to the institution B. Therefore, based on a consensus rule predefined between consortium blockchains, after only some blockchains in a plurality of blockchains need to successfully perform authorization verification on a user, the entire consortium blockchain may consider that the authorization verification on the user succeeds, to effectively reduce a quantity of times of verification when the user authorizes data in the blockchains in the consortium blockchain to the data user. In addition, a trust mechanism in the consortium blockchain may be ensured through an asymmetric signature, and a public key for verification is transferred and stored into each blockchain by using the cross-chain gateway, to avoid tampering and forging.

Figure 6:
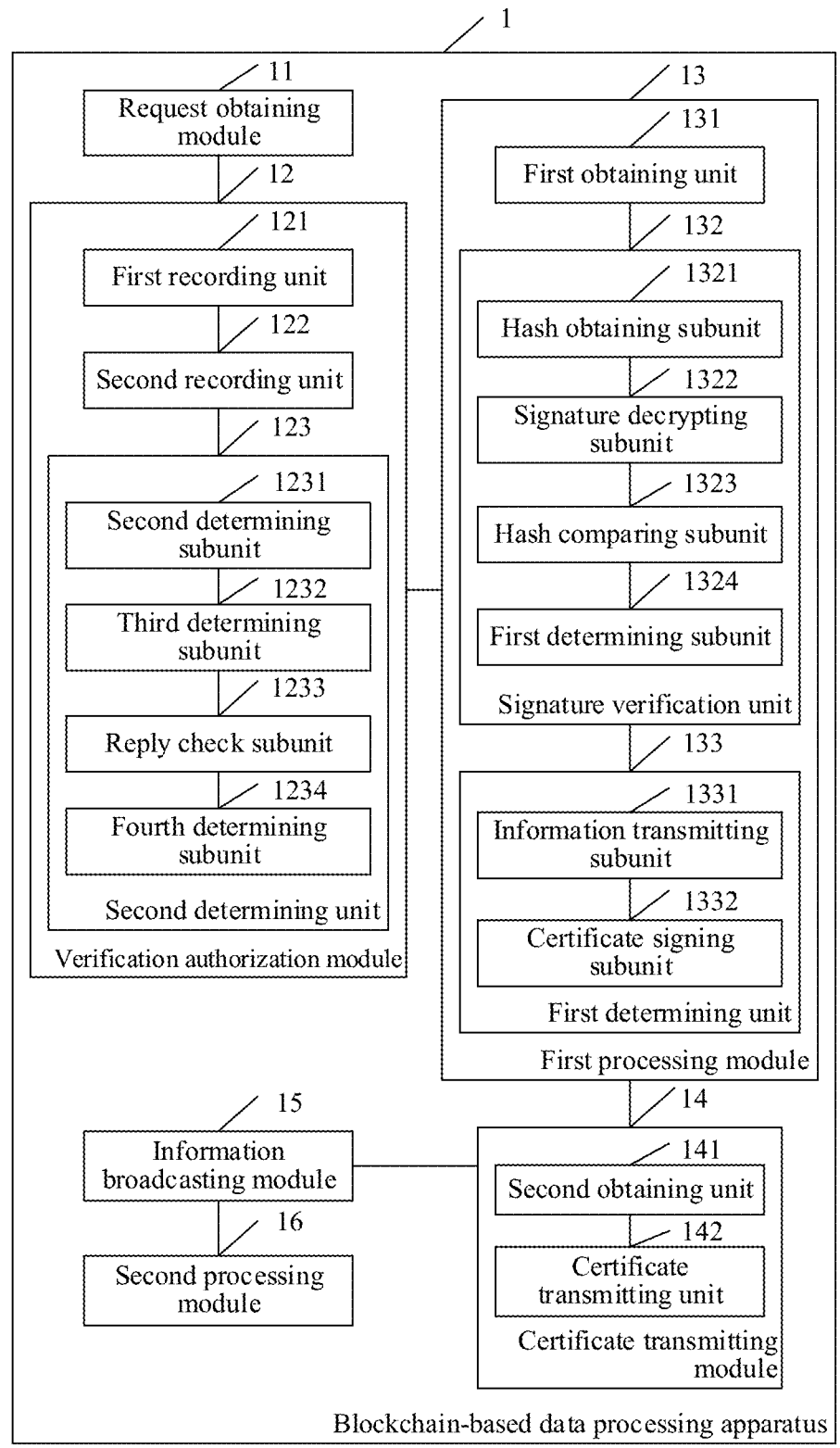
FIG. 6 is a schematic structural diagram of a blockchain-based data processing apparatus according to some embodiments.

FIG. 6 is a schematic structural diagram of a blockchain-based data processing apparatus 1 according to some embodiments. The blockchain-based data processing apparatus, may run in a verification node, the verification node corresponds to a blockchain A in a consortium blockchain, and the consortium blockchain further includes a blockchain B. The blockchain-based data processing apparatus may be a computer program (including program code) run in a computer device. For example, the blockchain-based data processing apparatus is application software. The apparatus may be configured to perform the corresponding operations in the method provided in some embodiments. As shown in FIG. 6, the blockchain-based data processing apparatus 1 may include: a request obtaining module 11, a verification authorization module 12, a first processing module 13, and a certificate transmitting module 14.

The request obtaining module 11 is configured to obtain a data authorization request transmitted by an authorization terminal, the data authorization request including a data authorization certificate associated with an authorizer.

The verification authorization module 12 is configured to perform authorization verification on the authorizer according to the data authorization request, to obtain a first verification result.

The first processing module 13 is configured to sign the data authorization certificate according to a private key of the first blockchain in a case that the first verification result is a valid result, to obtain a first certificate signature, determine the first certificate signature as a to-be-uploaded signature, and perform uploading on the data authorization certificate carrying the to-be-uploaded signature.

The certificate transmitting module 14 is configured to transmit, in a case that a certificate cross-chain query request transmitted by the second blockchain is received by using a cross-chain gateway, the data authorization certificate carrying the to-be-uploaded signature to the second blockchain by using the cross-chain gateway, and provide a query permission to a query terminal according to the data authorization certificate in a case that signature verification on the to-be-uploaded signature by the second blockchain succeeds, the query permission being used for the query terminal to obtain data provided by the authorizer in the second blockchain.

For specific function implementations of the request obtaining module 11, the verification authorization module 12, the first processing module 13, and the certificate transmitting module 14, reference may be made to operation S101 to operation S104 in the embodiment corresponding to FIG. 2, and details are not described herein again.

Referring to FIG. 6, the consortium blockchain further includes a third blockchain, and the third blockchain is a blockchain that has accepted the data authorization request.

The first processing module 13 may include a first obtaining unit 131, a signature verification unit 132, and a first determining unit 133.

The first obtaining unit 131 may be configured to obtain a third certificate signature corresponding to the data authorization certificate from the third blockchain by using the cross-chain gateway in a case that the first verification result is the valid result, the third certificate signature being obtained by signing the data authorization certificate by a node corresponding to the third blockchain according to a private key of the third blockchain in a case that a second verification result for the authorizer is the valid result.

The signature verification unit 132 may be configured to perform signature verification on the third certificate signature according to a public key of the third blockchain, to obtain a signature verification result.

The first determining unit 133 may be configured to sign the data authorization certificate according to the signature verification result and the private key of the first blockchain, to obtain the first certificate signature, and determine the first certificate signature and the third certificate signature as the to-be-uploaded signatures.

For specific function implementations of the first obtaining unit 131, the signature verification unit 132, and the first determining unit 133, reference may be made to operation S103 in the embodiment corresponding to FIG. 2, and details are not described herein again.

Referring to FIG. 6 again, the signature verification result includes a successful signature verification result and a failed signature verification result.

The first determining unit 133 may include an information transmitting subunit 1331 and a certificate signing subunit 1332.

The information transmitting subunit 1331 may be configured to transmit, in a case that the signature verification result is the failed signature verification result, authorization failure information for the data authorization request to the authorization terminal, and transmit signature verification failure information to the third blockchain by using the cross-chain gateway, the signature verification failure information being used for the third blockchain to detect the second certificate signature.

The certificate signing subunit 1332 may be configured to sign the data authorization certificate according to the private key of the first blockchain in a case that the signature verification result is the successful signature verification result, to obtain the first certificate signature.

For specific functional implementations of the information transmitting subunit 1331 and the certificate signing subunit 1332, reference may be made to operation S103 in the embodiment corresponding to FIG. 2, and details are not described herein again.

Referring to FIG. 6 again, the signature verification unit 132 may include: a hash obtaining subunit 1321, a signature decrypting subunit 1322, a hash comparing subunit 1323, and a first determining subunit 1324.

The hash obtaining subunit 1321 may be configured to obtain a first hash value corresponding to the data authorization certificate.

The signature decrypting subunit 1322 may be configured to decrypt the third certificate signature according to the public key of the third blockchain, to obtain a second hash value.

The hash comparing subunit 1323 may be configured to compare the first hash value with the second hash value.

The first determining subunit 1324 may be configured to determine the signature verification result as the successful signature verification result in a case that the first hash value is the same as the second hash value.

The first determining subunit 1324 may be further configured to determine the signature verification result as the failed signature verification result in a case that the first hash value is different from the second hash value.

For specific function implementations of the hash obtaining subunit 1321, the signature decryption subunit 1322, the hash comparing subunit 1323, and the first determining subunit 1324, reference may be made to operation S103 in the embodiment corresponding to FIG. 2, and details are not described herein again.

Referring to FIG. 6 again, the cross-chain gateway may include a second lightweight node corresponding to the second blockchain and a first lightweight node corresponding to the first blockchain. The first lightweight node may include a chain identifier of the second blockchain.

The certificate transmitting module 14 may include: a second obtaining unit 141 and a certificate transmitting unit 142.

The second obtaining unit 141 may be configured to obtain the chain identifier of the second blockchain in a case that the certificate cross-chain query request transmitted by the second lightweight node corresponding to the second blockchain is received by using the first lightweight node.

The certificate transmitting unit 142 may be configured to transmit the chain identifier of the second blockchain and the data authorization certificate carrying the to-be-uploaded signature to the first lightweight node, the chain identifier of the second blockchain being used for the first lightweight node to transmit the data authorization certificate carrying the to-be-uploaded signature to the second lightweight node corresponding to the second blockchain according to the chain identifier of the second blockchain.

For specific function implementations of the second obtaining unit 141 and the certificate transmitting unit 142, reference may be made to operation S104 in the embodiment corresponding to FIG. 2, and details are not described herein again.

Referring to FIG. 6, the blockchain-based data processing apparatus 1 may further include: an information broadcasting module 15 and a second processing module 16.

The information broadcasting module 15 may be configured to broadcast a public key of the first blockchain and a chain identifier of the first blockchain to the consortium blockchain by using the cross-chain gateway, so that remaining blockchains in the consortium blockchain perform uploading on the public key of the first blockchain and the chain identifier of the first blockchain, the remaining blockchains being blockchains other than the first blockchain in the consortium blockchain.

The second processing module 16 may be configured to obtain public keys of the remaining blockchains and chain identifiers of the remaining blockchains by using the cross-chain gateway, and perform uploading on the public keys of the remaining blockchains and the chain identifiers of the remaining blockchains.

For specific function implementations of the information broadcasting module 15 and the second processing module 16, reference may be made to operation S104 in the embodiment corresponding to FIG. 2, and details are not described herein again.

Referring to FIG. 6 again, the verification authorization module 12 may include: a first recording unit 121, a second recording unit 122, and a second determining unit 123.

The first recording unit 121 may be configured to transmit an authorization object verification request to the authorization terminal according to the data authorization request, and record a transmitting timestamp of transmitting the authorization object verification request.

The second recording unit 122 may be configured to obtain an authorization object verification reply returned by the authorization terminal, and record an obtaining timestamp of obtaining the authorization object verification reply.

The second determining unit 123 may be configured to determine the verification result A according to the authorization object verification reply, the transmitting timestamp, and the obtaining timestamp.

For specific function implementations of the first recording unit 121, the second recording unit 122, and the second determining unit 123, reference may be made to operation S102 in the embodiment corresponding to FIG. 2, and details are not described herein again.

Referring to FIG. 6 again, the second determining unit 123 may include: a second determining subunit 1231, a third determining subunit 1232, a reply check subunit 1233, and a fourth determining subunit 1234.

The second determining subunit 1231 may be configured to obtain a valid reply duration for the authorization object verification request, and determine an actual reply duration of the authorizer according to the transmitting timestamp and the obtaining timestamp.

The third determining subunit 1232 may be configured to determine the first verification result as an invalid result in a case that the actual reply duration is greater than the valid reply duration, and transmit reply invalid information for the data authorization request to the authorization terminal.

The reply check subunit 1233 may be configured to check validity of the authorization object verification reply in a case that the actual reply duration is less than or equal to the valid reply duration.

The fourth determining subunit 1234 may be configured to determine the first verification result as the invalid result in a case that the authorization object verification reply is an invalid reply, and transmit authorization failure information for the data authorization request to the authorization terminal.

The fourth determining subunit 1234 may be further configured to determine the first verification result as the valid result in a case that the actual reply duration is less than or equal to the valid reply duration and the authorization object verification reply is a valid reply.

For specific function implementations of the second determining subunit 1231, the third determining subunit 1232, the reply check subunit 1233, and the fourth determining subunit 1234, reference may be made to operation S102 in the embodiment corresponding to FIG. 2, and details are not described herein again.

Figure 7:
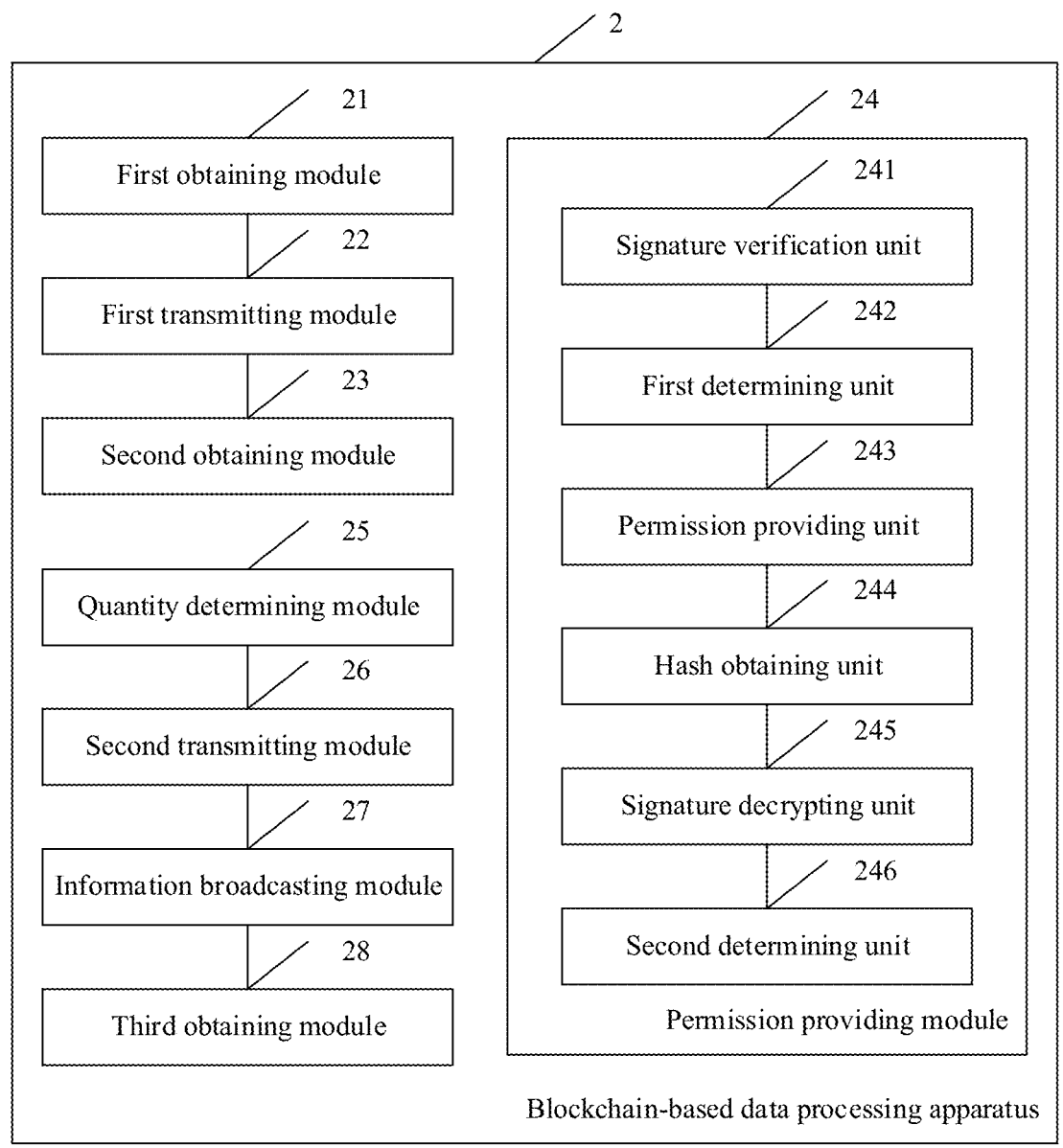
FIG. 7 is a schematic structural diagram of a blockchain-based data processing apparatus according to some embodiments.

FIG. 7 is a schematic structural diagram of a blockchain-based data processing apparatus 2 according to some embodiments. The blockchain-based data processing apparatus may run in a query node, the query node corresponds to a second blockchain in a consortium blockchain, and the consortium blockchain further includes a verification blockchain. The blockchain-based data processing apparatus may be a computer program (including program code) run in a computer device. For example, the blockchain-based data processing apparatus is application software. The apparatus may be configured to perform the corresponding operations in the method provided in the foregoing embodiments. As shown in FIG. 7, the blockchain-based data processing apparatus 2 may include: a first obtaining module 21, a first transmitting module 22, a second obtaining module 23, and a permission providing module 24.

The first obtaining module 21 may be configured to obtain a data query request associated with an authorizer and transmitted by a query terminal.

The first transmitting module 22 may be configured to transmit a certificate cross-chain query request for the authorizer to the verification blockchain by using a cross-chain gateway, the certificate cross-chain query request being used for triggering the verification blockchain to determine a data authorization certificate carrying a to-be-uploaded signature. The to-be-uploaded signature is obtained by signing the data authorization certificate by the verification blockchain according to a private key of the verification blockchain after the authorizer is determined as a valid authorizer.

The second obtaining module 23 may be configured to obtain, by using the cross-chain gateway, the data authorization certificate carrying the to-be-uploaded signature transmitted by the verification blockchain.

The permission providing module 24 may be configured to perform signature verification on the to-be-uploaded signature according to a public key of the verification blockchain, and provide a query permission to the query terminal according to the data authorization certificate in a case that the signature verification succeeds, the query permission being used for the query terminal to obtain data provided by the authorizer in the second blockchain.

For specific functional implementations of the first obtaining module 21, the first transmitting module 22, the second obtaining module 23, and the permission providing module 24, reference may be made to operation S201 to operation S204 in the foregoing embodiment corresponding to FIG. 4, and details are not described herein again.

Referring to FIG. 7 again, the data query request includes a chain identifier of the verification blockchain. The verification blockchain is a blockchain including a valid verification result of the data authorization certificate in the consortium blockchain.

The blockchain-based data processing apparatus 2 may further include: a quantity determining module 25 and a second transmitting module 26.

The quantity determining module 25 may be configured to determine a verification quantity of verification blockchains in the consortium blockchain according to the chain identifier of the verification blockchain.

The second transmitting module 26 may be configured to transmit data query failure information to the query terminal in a case that the verification quantity is less than a verification quantity threshold.

The second transmitting module 26 may be further configured to perform, in a case that the verification quantity is greater than or equal to the verification quantity threshold, the operation of transmitting a certificate cross-chain query request for the authorizer to the verification blockchain by using a cross-chain gateway.

For specific function implementations of the quantity determining module 25 and the second transmitting module 26, reference may be made to operation S201 in the embodiment corresponding to FIG. 4, and details are not described herein again.

Referring to FIG. 7 again, the blockchain-based data processing apparatus 2 may further include: an information broadcasting module 27 and a third obtaining module 28.

The information broadcasting module 27 may be configured to broadcast a public key of the second blockchain and a chain identifier of the second blockchain to the consortium blockchain by using the cross-chain gateway, so that remaining blockchains in the consortium blockchain perform uploading on the public key of the second blockchain and the chain identifier of the second blockchain. The remaining blockchains are blockchains other than the second blockchain in the consortium blockchain.

The third obtaining module 28 may be configured to obtain public keys of the remaining blockchains and chain identifiers of the remaining blockchains by using the cross-chain gateway, and perform uploading on the public keys of the remaining blockchains and the chain identifiers of the remaining blockchains.

For specific function implementations of the information broadcasting module 27 and the third obtaining module 28, reference may be made to operation S201 in the embodiment corresponding to FIG. 4, and details are not described herein again.

Referring to FIG. 7 again, the verification blockchain includes a first blockchain and a second blockchain, and the to-be-uploaded signature includes a first certificate signature and a third certificate signature. The first certificate signature is generated based on a private key of the first blockchain and the data authorization certificate, and the third certificate signature is generated based on a private key of the third blockchain and the data authorization certificate.

The permission providing module 24 may include: a signature verification unit 241, a first determining unit 242, and a permission providing unit 243.

The signature verification unit 241 may be configured to perform signature verification on the first certificate signature according to a public key of the first blockchain, to obtain a first signature verification result, and perform signature verification on the third certificate signature according to a public key of the third blockchain, to obtain a second signature verification result.

The first determining unit 242 may be configured to determine that the signature verification fails in a case that at least one of the first signature verification result and the second signature verification result is a failed signature verification result, and transmit data query failure information to the query terminal.

The first determining unit 242 may be further configured to determine that the signature verification succeeds in a case that both the first signature verification result and the second signature verification result are successful signature verification results, and sign the data authorization certificate according to a private key of the second blockchain, to obtain a second certificate signature.

The permission providing unit 243 may be configured to perform uploading on the second certificate signature and the data authorization certificate, and provide the query permission to the query terminal according to the data authorization certificate after the uploading succeeds.

For specific function implementations of the signature verification unit 241, the first determining unit 242, and the permission providing unit 243, reference may be made to operation S204 in the embodiment corresponding to FIG. 4, and details are not described herein again.

Referring to FIG. 7 again, the permission providing module 24 may include: a hash obtaining unit 244, a signature decrypting unit 245, and a second determining unit 246.

The hash obtaining unit 244 may be configured to obtain a first hash value corresponding to the data authorization certificate.

The signature decrypting unit 245 may be configured to decrypt the to-be-uploaded signature according to the public key of the verification blockchain, to obtain a second hash value.

The second determining unit 246 may be configured to compare the first hash value with the second hash value, and determine that the signature verification succeeds in a case that the first hash value is the same as the second hash value.

The second determining unit 246 may be further configured to determine that the signature verification fails in a case that the first hash value is different from the second hash value, and transmit data query failure information to the query terminal.

For specific function implementations of the hash obtaining unit 244, the signature decrypting unit 245, and the second determining subunit 246, reference may be made to operation S204 in the embodiment corresponding to FIG. 4, and details are not described herein again.

Figure 8:
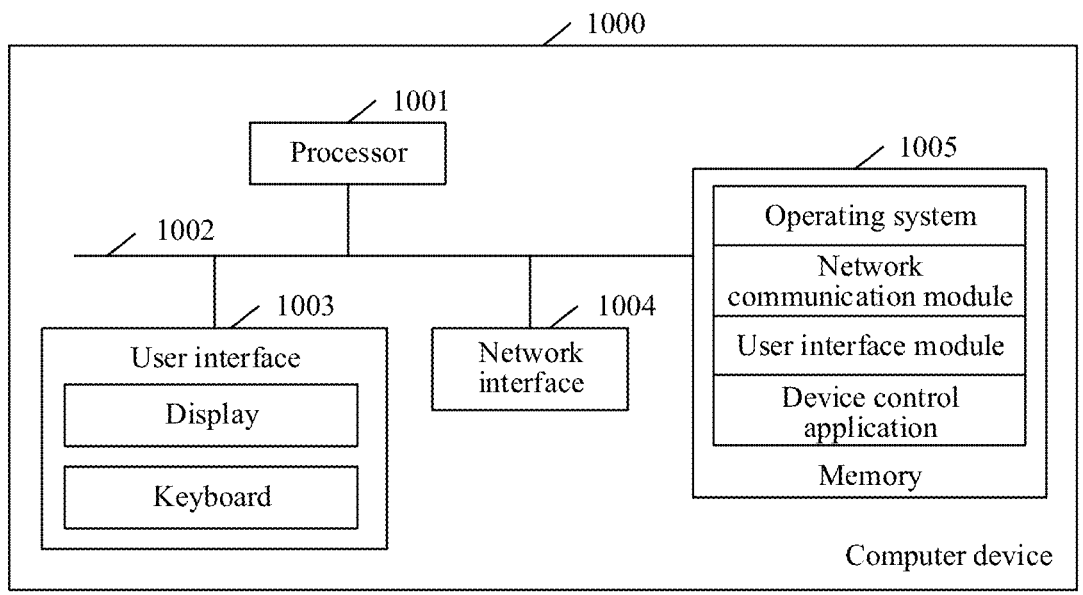
FIG. 8 is a schematic structural diagram of a computer device according to some embodiments.

FIG. 8 is a schematic structural diagram of a computer device according to some embodiments. As shown in FIG. 8, the computer device 1000 may include: a processor 1001, a network interface 1004, and a memory 1005, as well as a user interface 1003 and at least one communication bus 1002. The communication bus 1002 is configured to implement connection and communication between these components. The user interface 1003 may include a display, a keyboard, and optionally, the user interface 1003 may further include a standard wired interface and a standard wireless interface. The network interface 1004 may include a standard wired interface and a standard wireless interface (for example, a Wi-Fi interface). The memory 1005 may be a high-speed random access memory (RAM), or may be a non-volatile memory, for example, at least one magnetic disk storage. The memory 1005 may alternatively be at least one storage apparatus located away from the processor 1001. As shown in FIG. 8, the memory 1005 used as a computer-readable storage medium may include an operating system, a network communication module, a user interface module, and a device control application.

In the computer device 1000 shown in FIG. 8, the network interface 1004 may provide a network communication function, the user interface 1003 is mainly configured to provide an input interface for a user, and the processor 1001 may be configured to invoke the device control application stored in the memory 1005, to implement the corresponding operations of the blockchain-based data processing method in the embodiment corresponding to FIG. 2.

Figure 9:
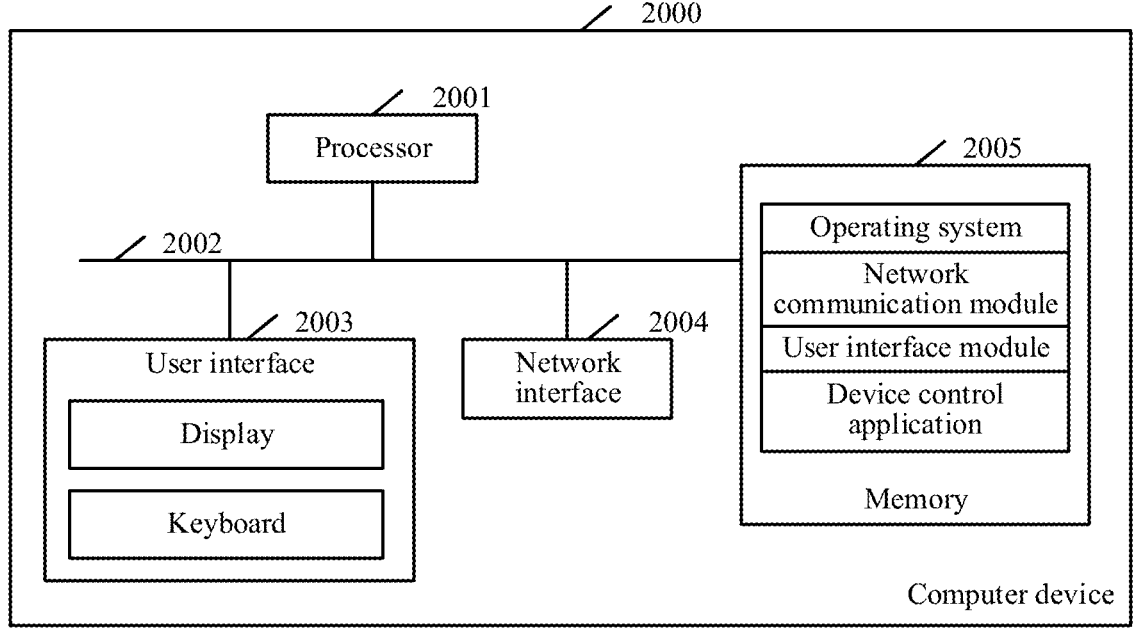
FIG. 9 is a schematic structural diagram of a computer device according to some embodiments.

FIG. 9 is a schematic structural diagram of a computer device according to some embodiments. As shown in FIG. 9, the computer device 2000 may include: a processor 2001, a network interface 2004, and a memory 2005, as well as a user interface 2003 and at least one communication bus 2002. The communication bus 2002 is configured to implement connection and communication between these components. The user interface 2003 may include a display, a keyboard, and optionally, the user interface 2003 may further include a standard wired interface and a standard wireless interface. The network interface 2004 may include a standard wired interface and a standard wireless interface (for example, a Wi-Fi interface). The memory 2005 may be a high-speed random access memory (RAM), or may be a non-volatile memory, for example, at least one magnetic disk storage. The memory 2005 may alternatively be at least one storage apparatus located away from the processor 2001. As shown in FIG. 9, the memory 2005 used as a computer-readable storage medium may include an operating system, a network communication module, a user interface module, and a device control application.

In the computer device 2000 shown in FIG. 9, the network interface 2004 may provide a network communication function, the user interface 2003 is mainly configured to provide an input interface for a user, and the processor 2001 may be configured to invoke the device control application stored in the memory 2005, to implement the corresponding operations of the blockchain-based data processing method in the embodiment corresponding to FIG. 4.

Some embodiments may further provide a computer-readable storage medium, storing a computer program, the computer program including program instructions, and the program instructions, when being executed by a processor, implementing the blockchain-based data processing method provided in the operations in FIG. 2 and FIG. 4. For details, reference may be made to the implementations provided in the operations in FIG. 2 and FIG. 4, and details are not described herein again.

The computer-readable storage medium may be the blockchain-based data processing apparatus provided in any of the foregoing embodiments or an internal storage unit of the computer device, for example, a hard disk or an internal memory of the computer device. The computer-readable storage medium may also be an external storage device of the computer device, such as a plug-in hard disk, a smart media card (SMC), a secure digital (SD) card, or a flash card that is equipped on the computer device. In some embodiments, the computer-readable storage medium may also include an internal storage unit of the computer device and an external storage device. The computer-readable storage medium is configured to store the computer program and another program and data that are required by the computer device. The computer-readable storage medium may be further configured to temporarily store data that has been outputted or data to be outputted.

In the specification, claims, and accompanying drawings of the embodiments, the terms "first", "second", or the like are intended to distinguish between different objects but do not indicate a particular order. In addition, the terms "include" and any variant thereof are intended to cover a non-exclusive inclusion. For example, a process, method, apparatus, product, or device that includes a series of steps/operations, units or code is not limited to the listed steps/operations or modules; and instead, further may include a step/operation, module or code that is not listed, or further may include another step/operation, unit or code that is intrinsic to the process, method, apparatus, product, or device.

What is disclosed above is merely exemplary embodiments of the disclosure, and certainly is not intended to limit the scope of the claims of the disclosure. Therefore, equivalent variations made in accordance with the claims of the disclosure shall fall within the scope of the disclosure.

What is claimed is:

1. A blockchain-based data processing method, performed by a computer device, comprising:
   obtaining a data authorization request transmitted by an authorization terminal, the data authorization request comprising a data authorization certificate associated with an authorizer;
   performing authorization verification on the authorizer according to the data authorization request, to obtain a first verification result;
   signing the data authorization certificate according to a private key of a first blockchain in a consortium blockchain in a case that the first verification result is a valid result to obtain a first certificate signature, determining the first certificate signature as a to-be-uploaded signature, and performing uploading on the data authorization certificate carrying the to-be-uploaded signature;
   transmitting, in a case that a certificate cross-chain query request transmitted by a second blockchain in the consortium blockchain is received by using a cross-chain gateway, the data authorization certificate carrying the to-be-uploaded signature to the second blockchain by using the cross-chain gateway; and
   providing a query permission to a query terminal according to the data authorization certificate in a case that signature verification on the to-be-uploaded signature by the second blockchain succeeds, the query permission being used for the query terminal to obtain data provided by the authorizer in the second blockchain.

2. The blockchain-based data processing method according to claim 1, wherein the consortium blockchain further comprises a third blockchain, the third blockchain is a blockchain that has accepted the data authorization request, and the method further comprises:
obtaining a third certificate signature corresponding to the data authorization certificate from the third blockchain by using the cross-chain gateway in a case that the first verification result is the valid result, the third certificate signature being obtained by signing the data authorization certificate by a node corresponding to the third blockchain according to a private key of the third blockchain in a case that a second verification result for the authorizer is the valid result;
performing signature verification on the third certificate signature according to a public key of the third blockchain, to obtain a signature verification result; and
signing the data authorization certificate according to the signature verification result and the private key of the first blockchain, to obtain the first certificate signature, and determining the first certificate signature and the third certificate signature as the to-be-uploaded signatures.

3. The blockchain-based data processing method according to claim 2, wherein the signing the data authorization certificate according to the signature verification result and the private key of the first blockchain, to obtain the first certificate signature comprises:
signing the data authorization certificate according to the private key of the first blockchain in a case that the signature verification result is a successful signature verification result, to obtain the first certificate signature.

4. The blockchain-based data processing method according to claim 3, further comprising:
transmitting, in a case that the signature verification result is a failed signature verification result, authorization failure information for the data authorization request to the authorization terminal, and transmitting signature verification failure information to the third blockchain by using the cross-chain gateway, the signature verification failure information being used for the third blockchain to detect the second certificate signature.

5. The blockchain-based data processing method according to claim 4, the performing signature verification on the third certificate signature according to a public key of the third blockchain, to obtain a signature verification result comprises:
obtaining a first hash value corresponding to the data authorization certificate;
decrypting the third certificate signature according to the public key of the third blockchain, to obtain a second hash value;
determining the signature verification result as the successful signature verification result in a case that the first hash value is the same as the second hash value; and
determining the signature verification result as the failed signature verification result in a case that the first hash value is different from the second hash value.

6. The blockchain-based data processing method according to claim 1, wherein the cross-chain gateway comprises a second lightweight node corresponding to the second blockchain and a first lightweight node corresponding to the first blockchain, and the first lightweight node comprises a chain identifier of the second blockchain; and the transmitting, in a case that a certificate cross-chain query request transmitted by the second blockchain is received by using a cross-chain gateway, the data authorization certificate carrying the to-be-uploaded signature to the second blockchain by using the cross-chain gateway comprises:
obtaining the chain identifier of the second blockchain in a case that the certificate cross-chain query request transmitted by the second lightweight node corresponding to the second blockchain is received by using the first lightweight node; and
transmitting the chain identifier of the second blockchain and the data authorization certificate carrying the to-be-uploaded signature to the first lightweight node, the chain identifier of the second blockchain being used for the first lightweight node to transmit the data authorization certificate carrying the to-be-uploaded signature to the second lightweight node corresponding to the second blockchain according to the chain identifier of the second blockchain.

7. The blockchain-based data processing method according to claim 6, further comprising:
broadcasting a public key of the first blockchain and a chain identifier of the first blockchain to the consortium blockchain by using the cross-chain gateway, the public key of the first blockchain and the chain identifier of the first blockchain being used for remaining blockchains in the consortium blockchain to perform uploading on the public key of the first blockchain and the chain identifier of the first blockchain, and the remaining blockchains being blockchains other than the first blockchain in the consortium blockchain; and
obtaining public keys of the remaining blockchains and chain identifiers of the remaining blockchains by using the cross-chain gateway, and performing uploading on the public keys of the remaining blockchains and the chain identifiers of the remaining blockchains.

8. The blockchain-based data processing method according to claim 1, wherein the performing authorization verification on the authorizer according to the data authorization request, to obtain a first verification result comprises:
transmitting an authorization object verification request to the authorization terminal according to the data authorization request, and recording a transmitting timestamp of transmitting the authorization object verification request;
obtaining an authorization object verification reply returned by the authorization terminal, and recording an obtaining timestamp of obtaining the authorization object verification reply; and
determining the first verification result according to the authorization object verification reply, the transmitting timestamp, and the obtaining timestamp.

9. The blockchain-based data processing method according to claim 8, wherein the determining the first verification result according to the authorization object verification reply, the transmitting timestamp, and the obtaining timestamp comprises:
obtaining a valid reply duration for the authorization object verification request, and determining an actual reply duration of the authorizer according to the transmitting timestamp and the obtaining timestamp;
determining the first verification result as an invalid result in a case that the actual reply duration is greater than the valid reply duration, and transmitting reply invalid information for the data authorization request to the authorization terminal;

checking validity of the authorization object verification reply in a case that the actual reply duration is less than or equal to the valid reply duration;

determining the first verification result as the invalid result in a case that the authorization object verification reply is an invalid reply, and transmitting authorization failure information for the data authorization request to the authorization terminal; and determining the first verification result as the valid result in a case that the actual reply duration is less than or equal to the valid reply duration and the authorization object verification reply is a valid reply.

10. A blockchain-based data processing apparatus comprising:

at least one memory configured to store program code; and at least one processor configured to read the program code and operate as instructed by the program code, the program code comprising:

request obtaining code configured to cause the at least one processor to obtain data authorization request transmitted by an authorization terminal, the data authorization request comprising a data authorization certificate associated with an authorizer;

verification authorization code configured to cause the at least one processor to perform authorization verification on the authorizer according to the data authorization request, to obtain a first verification result;

first processing code configured to cause the at least one processor to sign the data authorization certificate according to a private key of a first blockchain in a consortium blockchain in a case that the first verification result is a valid result to obtain a first certificate signature, determining the first certificate signature as a to-be-uploaded signature, and performing uploading on the data authorization certificate carrying the to-be-uploaded signature; and certificate transmitting code configured to cause the at least one processor to transmit, in a case that a certificate cross-chain query request transmitted by a second blockchain in the consortium blockchain is received by using a cross-chain gateway, the data authorization certificate carrying the to-be-uploaded signature to the second blockchain by using the cross-chain gateway, and provide a query permission to a query terminal according to the data authorization certificate in a case that signature verification on the to-be-uploaded signature by the second blockchain succeeds, the query permission being used for the query terminal to obtain data provided by the authorizer in the second blockchain.

11. The blockchain-based data processing apparatus according to claim 10, wherein the consortium blockchain further comprises a third blockchain, the third blockchain is a blockchain that has accepted the data authorization request, and the first processing code is further configured to cause the at least one processor to:

obtain a third certificate signature corresponding to the data authorization certificate from the third blockchain by using the cross-chain gateway in a case that the first verification result is the valid result, the third certificate signature being obtained by signing the data authorization certificate by a node corresponding to the third blockchain according to a private key of the third blockchain in a case that a second verification result for the authorizer is the valid result;

perform signature verification on the third certificate signature according to a public key of the third blockchain to obtain a signature verification result; and sign the data authorization certificate according to the signature verification result and the private key of the first blockchain to obtain the first certificate signature, and determine the first certificate signature and the third certificate signature as the to-be-uploaded signatures.

12. The blockchain-based data processing apparatus according to claim 11, wherein the sign the data authorization certificate according to the signature verification result and the private key of the first blockchain to obtain the first certificate signature, and determine the first certificate signature and the third certificate signature as the to-be-uploaded signatures comprises:

signing the data authorization certificate according to the private key of the first blockchain in a case that the signature verification result is a successful signature verification result to obtain the first certificate signature.

13. The blockchain-based data processing apparatus according to claim 12, wherein the sign the data authorization certificate according to the signature verification result and the private key of the first blockchain to obtain the first certificate signature, and determine the first certificate signature and the third certificate signature as the to-be-uploaded signatures further comprises:

transmitting, in a case that the signature verification result is a failed signature verification result, authorization failure information for the data authorization request to the authorization terminal, and transmitting signature verification failure information to the third blockchain by using the cross-chain gateway, the signature verification failure information being used for the third blockchain to detect the second certificate signature.

14. The blockchain-based data processing apparatus according to claim 13, wherein the perform signature verification on the third certificate signature according to a public key of the third blockchain to obtain a signature verification result comprises:

obtaining a first hash value corresponding to the data authorization certificate;

decrypting the third certificate signature according to the public key of the third blockchain, to obtain a second hash value;

comparing the first hash value with the second hash value; and determining the signature verification result as the successful signature verification result in a case that the first hash value is the same as the second hash value, and determining the signature verification result as the failed signature verification result in a case that the first hash value is different from the second hash value.

15. The blockchain-based data processing apparatus according to claim 10, wherein the cross-chain gateway comprises a second lightweight node corresponding to the second blockchain and a first lightweight node corresponding to the first blockchain, and the first lightweight node comprises a chain identifier of the second blockchain; and the certification transmitting code is further configured to cause the at least one processor to:

obtain the chain identifier of the second blockchain in a case that the certificate cross-chain query request transmitted by the second lightweight node corresponding to the second blockchain is received by using the first lightweight node; and transmit the chain identifier of the second blockchain and the data authorization certificate carrying the to-be-uploaded signature to the first lightweight node, the chain identifier of the second blockchain being used for the first lightweight node to transmit the data authorization certificate carrying the to-be-uploaded signature to the second lightweight node corresponding to the second blockchain according to the chain identifier of the second blockchain.

16. The blockchain-based data processing apparatus according to claim 15, wherein the program code further comprises:

information broadcasting code configured to cause the at least one processor to broadcast a public key of the first blockchain and a chain identifier of the first blockchain to the consortium blockchain by using the cross-chain gateway, the public key of the first blockchain and the chain identifier of the first blockchain being used for remaining blockchains in the consortium blockchain to perform uploading on the public key of the first blockchain and the chain identifier of the first blockchain, and the remaining blockchains being blockchains other than the first blockchain in the consortium blockchain; and second processing code configured to cause the at least one processor to obtain public keys of the remaining blockchains and chain identifiers of the remaining blockchains by using the cross-chain gateway, and perform uploading on the public keys of the remaining blockchains and the chain identifiers of the remaining blockchains.

17. The blockchain-based data processing apparatus according to claim 10, wherein the verification authorization code is further configured to cause the at least one processor to:

transmit an authorization object verification request to the authorization terminal according to the data authorization request, and record a transmitting timestamp of transmitting the authorization object verification request;

obtain an authorization object verification reply returned by the authorization terminal, and record an obtaining timestamp of obtaining the authorization object verification reply; and determine the first verification result according to the authorization object verification reply, the transmitting timestamp, and the obtaining timestamp.

18. The blockchain-based data processing apparatus according to claim 17, wherein the determine the first verification result according to the authorization object verification reply, the transmitting timestamp, and the obtaining timestamp comprises:

obtaining a valid reply duration for the authorization object verification request, and determining an actual reply duration of the authorizer according to the transmitting timestamp and the obtaining timestamp;

determining the first verification result as an invalid result in a case that the actual reply duration is greater than the valid reply duration, and transmitting reply invalid information for the data authorization request to the authorization terminal;

checking validity of the authorization object verification reply in a case that the actual reply duration is less than or equal to the valid reply duration;

determining the first verification result as the invalid result in a case that the authorization object verification reply is an invalid reply, and transmitting authorization failure information for the data authorization request to the authorization terminal; and determining the first verification result as the valid result in a case that the actual reply duration is less than or equal to the valid reply duration and the authorization object verification reply is a valid reply.

19. A non-transitory computer-readable storage medium, storing a computer program that when executed by at least one processor causes the at least one processor to:

obtain a data authorization request transmitted by an authorization terminal, the data authorization request comprising a data authorization certificate associated with an authorizer;

perform authorization verification on the authorizer according to the data authorization request to obtain a first verification result;

sign the data authorization certificate according to a private key of a first blockchain in a consortium blockchain in a case that the first verification result is a valid result to obtain a first certificate signature, determine the first certificate signature as a to-be-uploaded signature, and perform uploading on the data authorization certificate carrying the to-be-uploaded signature;

transmit, in a case that a certificate cross-chain query request transmitted by a second blockchain in the consortium blockchain is received by using a cross-chain gateway, the data authorization certificate carrying the to-be-uploaded signature to the second blockchain by using the cross-chain gateway; and provide a query permission to a query terminal according to the data authorization certificate in a case that signature verification on the to-be-uploaded signature by the second blockchain succeeds, the query permission being used for the query terminal to obtain data provided by the authorizer in the second blockchain.

20. The non-transitory computer-readable storage medium according to claim 19, wherein the consortium blockchain further comprises a third blockchain, the third blockchain is a blockchain that has accepted the data authorization request, and the at least one processor is further configured to:

obtain a third certificate signature corresponding to the data authorization certificate from the third blockchain by using the cross-chain gateway in a case that the first verification result is the valid result, the third certificate signature being obtained by signing the data authorization certificate by a node corresponding to the third blockchain according to a private key of the third blockchain in a case that a second verification result for the authorizer is the valid result;

perform signature verification on the third certificate signature according to a public key of the third blockchain to obtain a signature verification result; and sign the data authorization certificate according to the signature verification result and the private key of the first blockchain to obtain the first certificate signature, and determine the first certificate signature and the third certificate signature as the to-be-uploaded signatures.

* * * * *